United States Patent
Cheatham, III et al.

(10) Patent No.: US 9,437,002 B2
(45) Date of Patent: Sep. 6, 2016

(54) SYSTEMS AND METHODS FOR A DUAL MODALITY SENSOR SYSTEM

(71) Applicant: Elwha LLC, Bellevue, WA (US)

(72) Inventors: Jesse R. Cheatham, III, Seattle, WA (US); Roderick A. Hyde, Redmond, WA (US); Muriel Y. Ishikawa, Livermore, CA (US); Jordin T. Kare, Seattle, WA (US); Craig J. Mundie, Seattle, WA (US); Nathan P. Myhrvold, Bellevue, WA (US); Robert C. Petroski, Seattle, WA (US); Eric D. Rudder, Mercer Island, WA (US); Desney S. Tan, Kirkland, WA (US); Clarence T. Tegreene, Mercer Island, WA (US); Charles Whitmer, North Bend, WA (US); Andrew Wilson, Seattle, WA (US); Jeannette M. Wing, Bellevue, WA (US); Lowell L. Wood, Jr., Bellevue, WA (US); Victoria Y. H. Wood, Livermore, CA (US)

(73) Assignee: ELWHA LLC, Bellevue, WA (US)

( * ) Notice: Subject to any disclaimer, the term of this patent is extended or adjusted under 35 U.S.C. 154(b) by 43 days.

(21) Appl. No.: 14/496,037

(22) Filed: Sep. 25, 2014

(65) Prior Publication Data
US 2016/0093051 A1 Mar. 31, 2016

(51) Int. Cl.
*G06K 9/00* (2006.01)
*G06T 7/00* (2006.01)
*G06T 7/20* (2006.01)

(52) U.S. Cl.
CPC ......... *G06T 7/0042* (2013.01); *G06K 9/00375* (2013.01); *G06T 7/0081* (2013.01); *G06T 7/2073* (2013.01); *G06T 2207/10028* (2013.01); *G06T 2207/10132* (2013.01); *G06T 2207/20016* (2013.01); *G06T 2207/20212* (2013.01); *G06T 2207/30196* (2013.01)

(58) Field of Classification Search
None
See application file for complete search history.

(56) References Cited

U.S. PATENT DOCUMENTS

| | | | |
|---|---|---|---|
| 5,686,942 | A | 11/1997 | Ball |
| 5,702,323 | A | 12/1997 | Poulton |
| 6,066,075 | A | 5/2000 | Poulton |
| 6,857,746 | B2 | 2/2005 | Dyner |
| 7,317,819 | B2 | 1/2008 | Janes |
| 7,952,962 | B2 | 5/2011 | Walley et al. |
| 8,243,141 | B2 | 8/2012 | Greenberger et al. |
| 2004/0001182 | A1 | 1/2004 | Dyner |
| 2004/0013292 | A1* | 1/2004 | Raunig ............... G06K 9/0014 382/128 |
| 2005/0020902 | A1 | 1/2005 | Janes |
| 2005/0288588 | A1* | 12/2005 | Weber ................... A61B 8/483 600/447 |
| 2007/0085828 | A1 | 4/2007 | Schroeder et al. |

(Continued)

OTHER PUBLICATIONS

PCT International Search Report; International App. No. PCT/US2015/019614; May 19, 2015; pp. 1-3.

*Primary Examiner* — Nancy Bitar

(57) ABSTRACT

The present disclosure provides systems and methods for using two imaging modalities for imaging an object at two different resolutions. For example, the system may utilize a first modality (e.g., ultrasound or electromagnetic radiation) to generate image data at a first resolution. The system may then utilize the other modality to generate image data of portions of interest at a second resolution that is higher than the first resolution. In another embodiment, one imaging modality may be used to resolve an ambiguity, such as ghost images, in image data generated using another imaging modality.

40 Claims, 27 Drawing Sheets

(56) References Cited

U.S. PATENT DOCUMENTS

| | | |
|---|---|---|
| 2008/0039199 A1 | 2/2008 | Baer et al. |
| 2008/0311990 A1 | 12/2008 | Chiu et al. |
| 2008/0316863 A1 | 12/2008 | Walley et al. |
| 2009/0017910 A1 | 1/2009 | Rofougaran et al. |
| 2009/0052859 A1 | 2/2009 | Greenberger et al. |
| 2009/0054147 A1 | 2/2009 | Chiu et al. |
| 2009/0170601 A1 | 7/2009 | Chiu et al. |
| 2009/0258706 A1 | 10/2009 | Rofougaran et al. |
| 2010/0002550 A1* | 1/2010 | Oumi ............... G11B 5/02 369/13.02 |
| 2010/0278008 A1 | 11/2010 | Ammar |
| 2011/0141013 A1 | 6/2011 | Matthews |
| 2011/0269517 A1* | 11/2011 | Englert ........... A63B 24/0021 463/7 |
| 2012/0062729 A1 | 3/2012 | Hart et al. |
| 2012/0224456 A1 | 9/2012 | Visser et al. |
| 2012/0308140 A1 | 12/2012 | Ambrus et al. |
| 2012/0309532 A1 | 12/2012 | Ambrus et al. |
| 2013/0002550 A1* | 1/2013 | Zalewski ............. A63F 13/06 345/158 |
| 2013/0154930 A1 | 6/2013 | Xiang et al. |
| 2013/0249937 A1 | 9/2013 | Amacker et al. |
| 2013/0254066 A1 | 9/2013 | Amacker et al. |
| 2013/0254646 A1 | 9/2013 | Amacker et al. |
| 2013/0254647 A1 | 9/2013 | Amacker et al. |
| 2013/0254648 A1 | 9/2013 | Amacker et al. |

\* cited by examiner

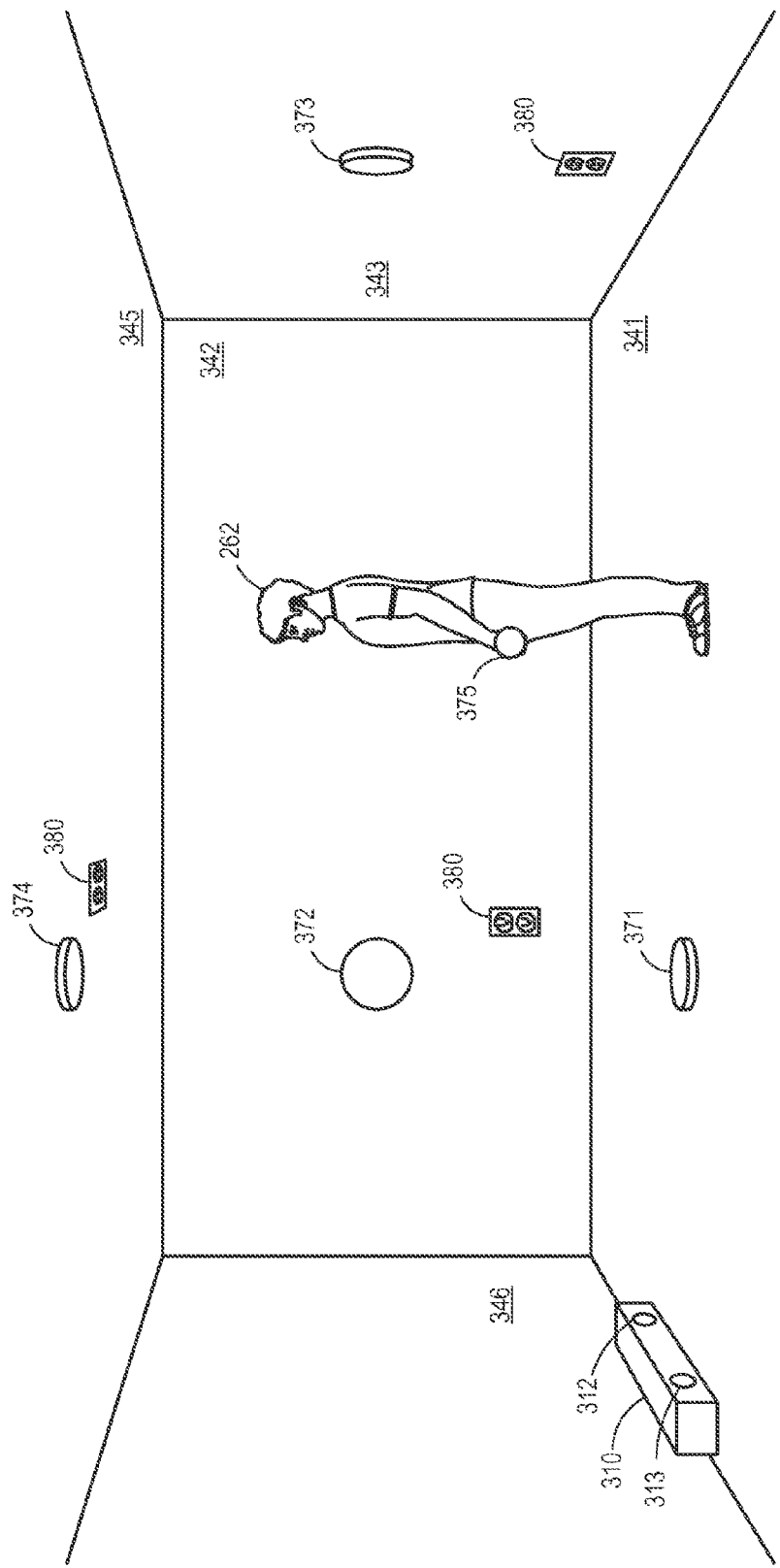

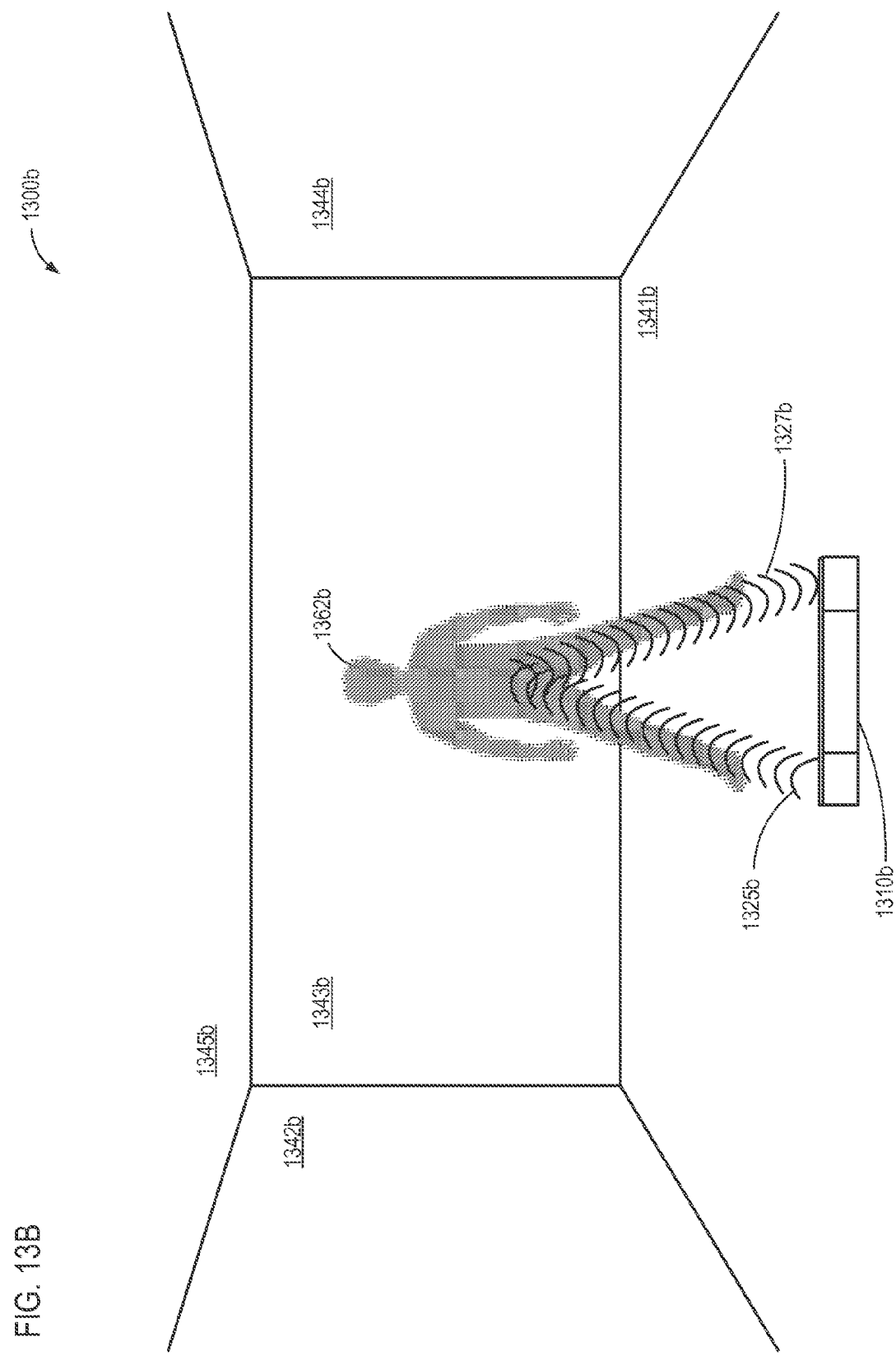

SYSTEMS AND METHODS FOR A DUAL MODALITY SENSOR SYSTEM

If an Application Data Sheet ("ADS") has been filed on the filing date of this application, it is incorporated by reference herein. Any applications claimed on the ADS for priority under 35 U.S.C. §§119, 120, 121, or 365(c), and any and all parent, grandparent, great-grandparent, etc., applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 U.S.C. §119(e) for provisional patent applications, for any and all parent, grandparent, great-grandparent, etc., applications of the Priority Application(s)).

PRIORITY APPLICATIONS

None.

RELATED APPLICATIONS

If the listings of applications provided herein are inconsistent with the listings provided via an ADS, it is the intent of the Applicants to claim priority to each application that appears in the Priority Applications section of the ADS and to each application that appears in the Priority Applications section of this application.

All subject matter of the Priority Applications and the Related Applications and of any and all parent, grandparent, great-grandparent, etc., applications of the Priority Applications and the Related Applications, including any priority claims, is incorporated herein by reference to the extent such subject matter is not inconsistent herewith.

This application is related to U.S. patent application Ser. No. 14/203,401, filed on Mar. 10, 2014, titled SYSTEMS AND METHODS FOR ULTRASONIC POSITION AND MOTION DETECTION, and to U.S. patent application Ser. No. 14/280,463, filed on May 16, 2014, titled SYSTEMS AND METHODS FOR ULTRASONIC VELOCITY AND ACCELERATION DETECTION, which applications are hereby incorporated by reference in its entirety.

TECHNICAL FIELD

This disclosure relates to systems and methods for generating an image of an object within a region. Specifically, this disclosure provides systems and methods for using a dual modality sensor (e.g., ultrasound and electromagnetic radiation) in combination with, for example, entertainment devices.

SUMMARY

A system may utilize a dual modality sensor to generate image data. The system may use a first modality to generate coarse image data of an object. The system may then use this coarse image data to identify portions of interest of the object. The system may use a second modality to generate fine image data of the identified portions of interest.

For example, in various embodiments, a system may include one or more ultrasonic transmitters and/or receivers to implement a first modality. In some embodiments the transmitter(s) and/or receiver(s) may be embodied as one or more transceivers. An ultrasonic transmitter may be configured to transmit ultrasound into a region bounded by one or more surfaces. The ultrasonic receiver may receive direct ultrasonic reflections from one or more objects within the region. As described in detail below, the system may use the ultrasonic transmitters and/or receivers to generate coarse image data of an object and identify, based on the coarse image data, portions of interest of the object.

For instance, in certain examples, a system may also be configured to receive, via an electromagnetic receiver, an electromagnetic reflection from an object within a region. The system may generate fine image data of identified portions of interest using the received electromagnetic reflection. For example, after a portion of interest has been identified via coarse image data, the system may receive electromagnetic radiation from the identified portion of interest and generate image data with greater resolution than available in the coarse image data (referred to herein as fine image data).

In some embodiments, the dual modalities may be used to resolve at least one ambiguity. For example, image data received from a first modality may include an ambiguity, such as a ghost image. In such an example, a second modality may be utilized by the system to resolve the ambiguity introduced by the first modality, e.g., the ghost image in the image data generated using the first modality. As a specific example, received electromagnetic radiation can be utilized by a system to correct a ghost image introduced by received ultrasound reflections.

Either of the two modalities discussed above (i.e., electromagnetic imaging and ultrasound) can be utilized by the system to generate either the fine image data or the coarse image data. For example, a first embodiment may utilize ultrasound to generate coarse image data and electromagnetic imaging to generate fine image data, whereas a second embodiment may utilize electromagnetic imaging to generate coarse image data and ultrasound to generate fine image data.

The foregoing summary is illustrative only and is not intended to be limiting in any way. In addition to the illustrative aspects, embodiments, and features described above, further aspects, embodiments, and features are demonstrated with reference to the drawings and the following detailed description.

BRIEF DESCRIPTION OF THE DRAWINGS

FIG. 3A illustrates a plurality of ultrasonic reflectors configured to facilitate the transmission, reflection, and/or reception of rebounded ultrasound by the positioning system.

FIG. 13B illustrates a dual modality system generating coarse image data of an object based on received ultrasonic reflections.

DETAILED DESCRIPTION

Figure 1A:
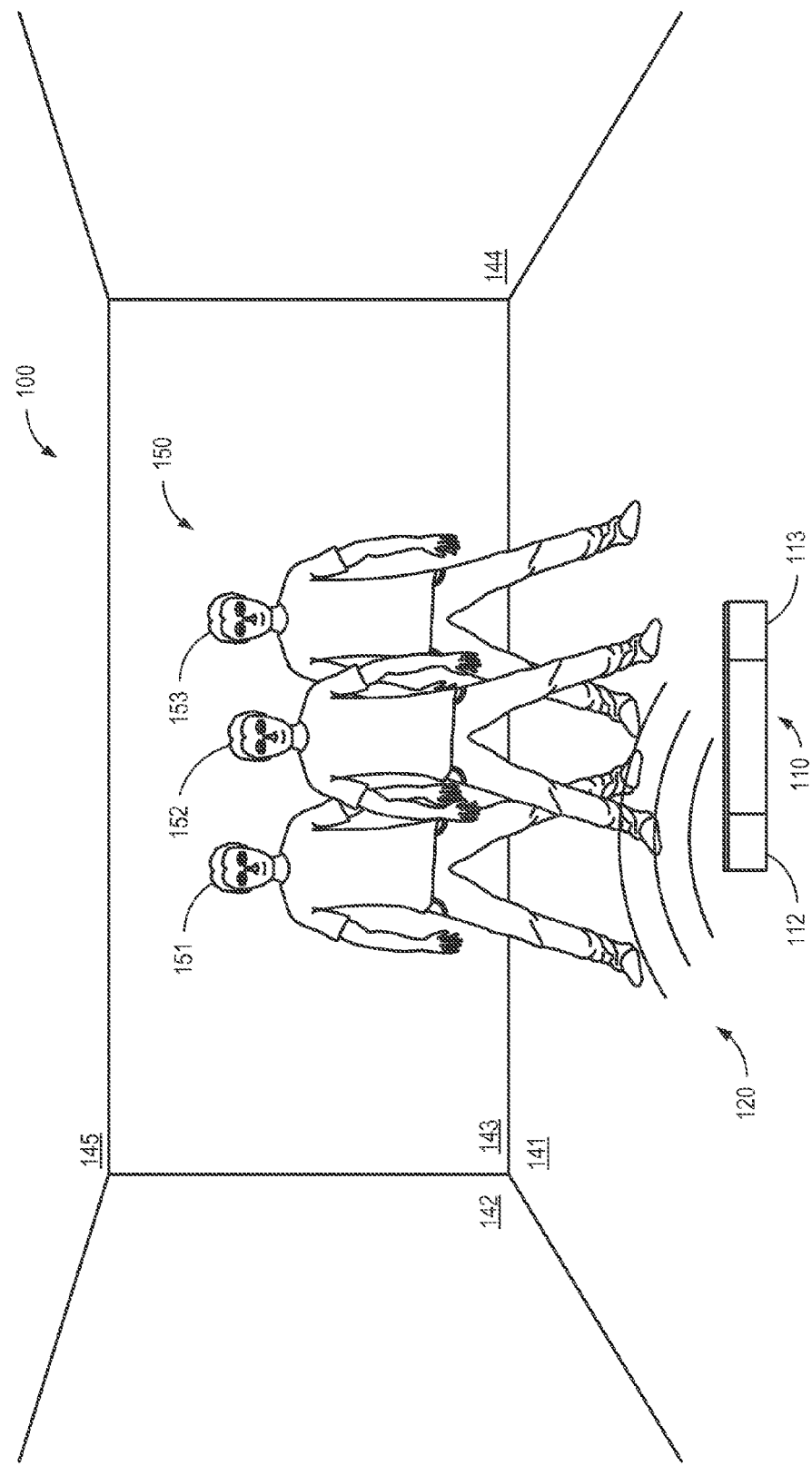
FIG. 1A illustrates a positioning system transmitting ultrasound toward three persons within a bounded region.

A system may utilize a dual modality sensor system to generate image data. For instance, a system may utilize two imaging modalities for imaging an object at two different resolutions. That is, the system may utilize a first modality (e.g., either ultrasound or electromagnetic radiation) to generate image data of an object at a first resolution. The system may then utilize the other modality to generate image data of portions of interest on the object (not necessarily the entire object) at a second resolution, where the second resolution is higher than the first resolution. Accordingly, the dual modalities may be used to generate a coarse (i.e., lower resolution) image of the entire object using a first modality, identify portions of interest on the object, and then generate a fine (i.e., higher resolution) image of the portions of interest using a second modality.

As a specific example, a system may transmit ultrasound, via a first ultrasonic transmitter, into the region. An ultrasonic receiver may receive ultrasonic reflections of the transmitted ultrasound from a plurality of sites on the object within the region. A processor may generate coarse image data of the object at a first resolution based on the received ultrasonic reflections. The system may then identify a portion of interest on the object based on the coarse image data. Electromagnetic radiation may be received from the identified portion of interest on the object. Fine image data of the portion of interest on the object may be generated at a second resolution based on the received electromagnetic radiation. The second resolution may be greater than the first resolution. In some embodiments, the first resolution may be greater than the second resolution.

In some embodiments, a kinematic value may be determined that is associated with the portion of interest on the object based on at least one of the received electromagnetic radiation and the received ultrasonic reflections. Similarly, in some embodiments, the state of an entertainment device may be modified based on the determined kinematic value associated with the portion of interest on the object.

In some embodiments, the coarse image data described above may be generated based on the received electromagnetic reflections and the fine image data may be generated based on the received ultrasonic reflections. In any of the various embodiments described herein, the received electromagnetic radiation may be generated by the system, by another system, by an auxiliary electromagnetic radiation source, and/or comprise ambient electromagnetic radiation, such as light.

In some embodiments, one imaging modality may be used to resolve an ambiguity, such as ghost images, in image data generated using another imaging modality. For example, an image generated using ultrasound imaging technologies may have an ghosting image ambiguity that can be resolved using an electromagnetic imaging technology (or even just an electromagnetic position/distance detection technology).

For example, a system may include one or more ultrasonic transmitters and/or receivers, as well as one or more electromagnetic transmitters and/or receivers. Each of these different modalities may capture image data at different resolutions. The system may generate non- or less-important image data at a lower resolution while capturing important image data at a higher resolution. In some embodiments, generating only a portion of the image at a higher resolution may allow the system to process the image data faster and in a more compressed manner while still providing high resolution of portions of interest.

In some embodiments, the transmitter(s) and/or receiver(s) may be embodied as one or more transceivers. The ultrasonic transmitter(s) and/or receiver(s) may be operated by the system concurrently with the electromagnetic receiver(s) or in sequential order before or after the electromagnetic receiver(s). The ultrasonic transmitter(s) and receiver(s) may be used in combination with the electromagnetic receiver to generate image data.

One or more of the electromagnetic and/or ultrasonic transmitters, receivers, and/or transceivers may comprise a piezoelectric transducer that may be part of a single transducer system or an array of transducers. In some embodiments, the transducers may comprise or be made from metamaterials. A flat sub-wavelength array of ultrasonic transducers may be used in conjunction with the embodiments described herein, such as those utilizing arrays of metamaterials.

The dual modality sensor system may be configured to utilize different frequency spectrums. An ultrasonic transmitter used on such a system may be configured to transmit ultrasound into a region bounded by one or more surfaces. The ultrasound may be between 20 kHz and 250 kHz. In one embodiment, the ultrasound is specifically between 35 kHz and 45 kHz. An electromagnetic transmitter and/or receiver may also be used on such a system to transmit and/or receive a range of electromagnetic radiation frequencies. For example, a system may be configured to use electromagnetic microwave, terahertz, infrared, visible, and/or ultraviolet radiation. A dual modality sensor system may use the two modalities to produce more detailed image data and/or to correct ambiguities introduced by one of the modalities.

For example, the system may use a first modality to generate coarse image data of an object, and, to get more detailed data about an identified portion of interest, the system may use a second modality to generate fine image data of the identified portion of the object. For example, if the first modality produces an image with a low resolution of an object, the second modality may be used to provide a higher resolution of portions of interest on the object. Another embodiment may include a first modality that introduces an ambiguity into the image data. To correct the ambiguity, the system may use a second modality that isn't susceptible to the same type of ambiguity.

For example, the system may include one or more ultrasonic transmitters and/or receivers. The system may use the ultrasonic receivers and/or transmitters to generate coarse image data. For instance, an ultrasonic transmitter may be configured to transmit ultrasound into a region. An ultrasonic receiver may receive ultrasonic reflections from one or more objects within the region. Based on these received ultrasonic reflections, the system may generate coarse image data of the one or more objects via a processor.

The system may identify portions of interest on the object using the coarse image data. For example, the system may identify a person's hand, finger, arm, leg foot, toe, torso, neck, head, mouth, lip, and/or eye. The portion of interest identified may be based on a state of an entertainment device. Once one or more portions of interest have been identified, the system may use a second modality (e.g., electromagnetic radiation) to gather further details about the portion of interest.

For instance, the system may also electromagnetic receiver(s) and/or transmitter(s). The system may generate fine image data of the identified portions of interest using received electromagnetic reflections. For example, after a portion of interest has been identified using the coarse image data, the system may receive electromagnetic radiation from the identified portion of interest and generate higher resolution image of the identified portions of interest.

In some embodiments, a second modality may be used to resolve at least one ambiguity inherent in or caused by the usage of the first modality. For example, image data generated using the first modality may include an ambiguity. For example, image data generated via ultrasound may have ghost images inherent in the image data. In such an example, a second modality (e.g., electromagnetic radiation) may be utilized by the system to resolve the ambiguity introduced by the first modality. For instance, received electromagnetic radiation can be utilized by the system to remove ghost images in the image data generated using the ultrasound reflections.

Either of the two modalities discussed above (i.e., electromagnetic imaging and ultrasound) may be utilized by the system to generate either fine image data or coarse image data. For example, a first embodiment may utilize ultrasound to generate coarse image data and electromagnetic imaging to generate fine image data, whereas a second embodiment may utilize electromagnetic imaging to generate coarse image data and ultrasound to generate fine image data.

A kinematic value associated with the object or a specific portion of interest on the object may be determined. The kinematic value of an object may comprise the position, velocity, and/or acceleration of the object. The kinematic values may be based on the received electromagnetic radiation and/or the received ultrasonic reflections.

In some embodiments, the direct ultrasound may be reflected from a first portion of an object and the rebounded ultrasound may be reflected from a second, different portion of the object. Positional data may be determined using the received ultrasonic reflections. Direct positional data may correspond to a first directional component of the position of the object and the rebounded positional data may correspond to a second directional component of the position of the object. Similarly, one or more direct and/or rebounded ultrasonic reflections may be used to determine velocity and/or acceleration. For example, velocity and/or acceleration information may be determined using a Doppler shift that corresponds to a motion of the reflecting object.

In some embodiments, received ultrasonic reflections (direct or rebounded) may be used to determine positional data. Positional data sampled at various times may be used to determine and/or estimate current and/or future velocity and/or acceleration information associated with an object. In other embodiments, as described herein, velocity and/or acceleration information may be calculated based on a detected shift in ultrasound reflected by an object. For example, a system may detect a Doppler shift in ultrasound reflected by an object relative to the transmitted ultrasound. A shift to a longer wavelength may indicate that the object is moving away from the ultrasonic receiver. A shift to a shorter wavelength may indicate that the object is moving toward the ultrasonic receiver. The detected shift may be related to a frequency shift, a wavelength shift, a phase shift, a time-shifted reflection, and/or other ultrasonic shift.

Any number of direct and/or rebounded ultrasonic reflections may be obtained from one or more objects within a region to obtain velocity and/or acceleration data over a period of time and/or to obtain more accurate velocity and/or acceleration data with multiple data points. The transmitted ultrasound may be transmitted as directional or non-directional ultrasonic pulses, continuously, in a modulated (frequency, amplitude, phase, etc.) fashion, and/or other format. The ultrasonic transmissions may be spaced at regular intervals, on demand, and/or based on the reception of a previously transmitted ultrasonic transmission. Direct and rebounded ultrasound pulses may be transmitted at the same time, or either one can be transmitted before the other.

Rebounded ultrasonic reflections may be defined as ultrasonic reflections that, in any order, reflect off at least one surface in addition to the object. For example, the rebounded ultrasonic reflections may be reflected off any number of surfaces and/or objects (in any order) prior to being received by the ultrasonic receiver.

A mapping or positioning system may generate positional data associated with one or more of the object(s) based on the direct ultrasonic reflection(s) and/or the rebounded ultrasonic reflection(s). The positional data may comprise a centroid of the objects, a two-dimensional mapping of the object, an image of the object, a false-color representation of the object, an information representation (blocks, squares, shadows, etc.) of the object, a three-dimensional mapping of the object, one or more features of the object, and/or other information.

The velocity and/or acceleration data may be defined with respect to one or more surfaces of the region, the ultrasonic velocity/acceleration system, a receiver of the system, and/or a transmitter of the system. The one or more objects within the region may comprise machinery, robots, furniture, household property, people in general, gamers, human controllers of electronic devices, electronic devices, fixtures, and/or other human or non-human objects.

The object may comprise a specific portion of a person, such as a hand, finger, arm, leg, foot, toe, torso, neck, head, mouth, lip, or eye. In some embodiments, rebounded ultrasonic transmissions may be reflected off an ultrasonic reflector disposed within the room. In some embodiments, the ultrasonic reflectors may be mounted and/or otherwise positioned within the region. In other embodiments, the ultrasonic reflectors may be held, worn, and/or otherwise in the position of the user or operator of the ultrasonic positioning system. The ultrasonic reflectors may modify a characteristic of the reflected ultrasound, facilitating the identification of the received rebounded ultrasonic reflections.

Ultrasonic reflectors may comprise passive, active, and/or actively moved/pivoted ultrasonic reflectors for controlling the direction in which ultrasound rebounds and/or otherwise travels within the region. For example, the ultrasonic reflector may be configured to modify one or more of the frequency, phase, and/or amplitude of the rebounded ultrasound. The modified characteristic may facilitate the differentiation of the direct ultrasonic reflections and the rebounded ultrasonic reflections. In some embodiments the direct and rebounded signals can be differentiated using knowledge of the transmission or reception directions of the respective beams. In some embodiments, the direct and rebounded signals can be differentiated using knowledge of the time-of-flight of the respective beams. In some embodiments, the direction of a reflected beam (and hence directional characteristics of its delivered positional information) can be determined by knowledge of the orientation of the reflecting surface and its reflective characteristics. For example, ultrasonic reflection from a surface may be dominated by specular reflection, thereby allowing straightforward determination of the rebound geometry.

The mapping or positioning system may also generate velocity and/or acceleration data using the rebounded ultrasonic reflection of the object(s) from the one or more surfaces. It will be appreciated that a rebounded ultrasonic reflection from a surface may be rebounded off the surface first and then the object, or off the object first and then the surface.

The system may then generate enhanced velocity and/or acceleration data by combining the direct velocity and/or acceleration data and the rebounded velocity and/or acceleration data. The enhanced velocity and/or acceleration data may be a concatenation of the direct and rebounded velocity and/or acceleration data or a simple or complex function of the direct and rebounded velocity and/or acceleration data.

For example, in one embodiment, the direct and rebounded velocity and/or acceleration data may comprise only time-of-flight information, which, based upon air sound-speed, can be converted to transit distance information for each beam. In such embodiments, the direct velocity and/or acceleration data provides a range from the transceiver to the object, i.e., leaving the velocity and/or acceleration undefined along a two-dimensional spherical surface. Each potential object position along this spherical surface leads, e.g., assuming specular reflections, to a distinct time-of-flight for the rebounded beam from one surface (wall, ceiling, floor); this restricts the locus of possible velocities and/or accelerations of the object to a one-dimensional arc along the spherical surface, thereby improving the velocity and/or acceleration estimate(s).

The system can further refine the velocity and/or acceleration data by analyzing rebound data from a second surface. In the current example, each potential object position along the spherical surface (obtained by the time-of-flight of the direct beam) defines a first time-of-flight for ultrasound rebounded from the first surface and a second time-of-flight for ultrasound rebounded from the second surface; knowledge of both times-of-flight determines the object's position. It is clear that time-of-flight data from other surfaces can, by "over defining" the problem, improve the positional estimate, e.g., by reducing sensitivity to measurement errors, to the effects of diffuse reflections, etc. In other embodiments, the direct and rebounded velocity and/or acceleration data may comprise directional information.

For example, directional information for direct ultrasound can identify that the object (or a specified portion of it) lies along a known ray, thereby providing two components of its velocity and/or acceleration. Information from rebounded ultrasound can then provide additional acceleration and/or velocity data sufficient to identify the third component of the object's velocity and/or acceleration, i.e., along the ray. The rebounded ultrasound may provide time-of-flight information; each object velocity and/or acceleration along the ray corresponds to a different time-of-flight for rebounded ultrasound from a surface, so the measured time-of-flight identifies the object's location, velocity, and/or acceleration. The rebounded ultrasound may provide directional information (for either transmission or reception); the intersection of this rebound ray with the direct ray serves to identify the object's location, velocity, and/or acceleration.

The enhanced velocity and/or acceleration data may be further enhanced or augmented using additional velocity and/or acceleration data obtained via direct or rebounded ultrasonic reflections and/or other velocity and/or acceleration data, such as velocity and/or acceleration data obtained via other means/systems/methods (e.g., laser detection, cameras, etc.). The direct and the rebounded velocity and/or acceleration data may provide velocity and/or acceleration data for the object at the same or different times, depending on the time at which they are reflected from the object. The enhanced positional data may be analyzed using a dynamical model, e.g., a Kalman filter, designed to combine velocity and/or acceleration data corresponding to different times or directional components, using them together with, and to improve, estimates of the object's present and/or future motion.

In some embodiments, direct ultrasonic reflections may not be used. Rather, a first rebounded ultrasonic reflection and a second rebounded ultrasonic reflection may be used to generate velocity and/or acceleration data. It is appreciated that any number of direct or rebounded ultrasonic reflections may be used to identify a position, velocity, acceleration, and/or other movement information of an object within a region. In various embodiments, the velocity and/or acceleration data gathered using ultrasonic reflections may be combined with other velocity and/or acceleration data, such as infrared, velocity and/or acceleration data provided by manual input, echo location, sonar techniques, laser, and/or the like.

In various embodiments, one or more local, remote, or distributed systems and/or system components may transmit ultrasound via an ultrasonic transmitter into a region. The received ultrasound may include both direct reflections and rebounded reflections. Velocity and/or acceleration data from both the direct reflections and the rebounded reflections may be used to obtain velocity and/or acceleration data that more accurately and/or more quickly describes the relative velocity and/or acceleration data of one or more objects within the region.

Embodiments may include various steps, which may be embodied in machine-executable instructions to be executed by a computer system. A computer system includes one or more general-purpose or special-purpose computers (or other electronic devices). The computer system may include hardware components that include specific logic for performing the steps or may include a combination of hardware, software, and/or firmware.

Embodiments may also be provided as a computer program product including a computer-readable medium having stored thereon instructions that may be used to program a computer system or other electronic device to perform the processes described herein. The computer-readable medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of media/computer-readable media suitable for storing electronic instructions.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even standalone machines which communicate with other machines by physical transport of media. In particular, a suitable network may be formed from parts or entireties of two or more other networks, including networks using disparate hardware and network communication technologies.

One suitable network includes a server and several clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

The network may include communications or networking software, such as the software available from Novell, Microsoft, Artisoft, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Each computer system includes at least a processor and a memory; computer systems may also include various input devices and/or output devices. The processor may include a general purpose device, such as an Intel®, AMD®, or other "off-the-shelf" microprocessor. The processor may include a special purpose processing device, such as an ASIC, SoC, SiP, FPGA, PAL, PLA, FPLA, PLD, or other customized or programmable device. The memory may include static RAM, dynamic RAM, flash memory, one or more flip-flops, ROM, CD-ROM, disk, tape, magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The computer systems may be capable of using a floppy drive, tape drive, optical drive, magneto-optical drive, or other means to read a storage medium. A suitable storage medium includes a magnetic, optical, or other computer-readable storage device having a specific physical configuration. Suitable storage devices include floppy disks, hard disks, tape, CD-ROMs, DVDs, PROMs, RAM, flash memory, and other computer system storage devices. The physical configuration represents data and instructions which cause the computer system to operate in a specific and predefined manner as described herein.

Suitable software to assist in implementing the invention is readily provided by those of skill in the pertinent art(s) using the teachings presented here and programming languages and tools, such as Java, Pascal, C++, C, database languages, APIs, SDKs, assembly, firmware, microcode, and/or other languages and tools. Suitable signal formats may be embodied in analog or digital form, with or without error detection and/or correction bits, packet headers, network addresses in a specific format, and/or other supporting data readily provided by those of skill in the pertinent art(s).

Several aspects of the embodiments described will be illustrated as software modules or components. As used herein, a software module or component may include any type of computer instruction or computer executable code located within a memory device. A software module may, for instance, include one or more physical or logical blocks of computer instructions, which may be organized as a routine, program, object, component, data structure, etc., that performs one or more tasks or implements particular abstract data types.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Much of the infrastructure that can be used according to the present invention is already available, such as: general purpose computers, computer programming tools and techniques, computer networks and networking technologies, digital storage media, authentication, access control, and other security tools and techniques provided by public keys, encryption, firewalls, and/or other means.

The embodiments of the disclosure are described below with reference to the drawings, wherein like parts are designated by like numerals throughout. The components of the disclosed embodiments, as generally described and illustrated in the figures herein, could be arranged and designed in a wide variety of different configurations. Furthermore, the features, structures, and operations associated with one embodiment may be applicable to or combined with the features, structures, or operations described in conjunction with another embodiment. In other instances, well-known structures, materials, or operations are not shown or described in detail to avoid obscuring aspects of this disclosure.

Thus, the following detailed description of the embodiments of the systems and methods of the disclosure is not intended to limit the scope of the disclosure, as claimed, but is merely representative of possible embodiments. In addition, the steps of a method do not necessarily need to be executed in any specific order, or even sequentially, nor do the steps need to be executed only once.

FIG. 1A illustrates a dual modality positioning system 110 transmitting ultrasound 120 toward three persons 151, 152, and 153 in a group 150 within a bounded region 100. As illustrated, the bounded region 100 is bounded by a floor 141, a left wall 142, a back wall 143, a right wall 144, and a ceiling 145. A front wall (not shown), may also bound the region 100.

The dual modality positioning system 110 may transmit the ultrasound 120 as directional ultrasonic pulses, continuously, in a modulated fashion (frequency, amplitude, phase, etc.), and/or in another format. The ultrasound 120 may be transmitted directly toward the persons 151, 152, and 153. The ultrasound 120 may be transmitted indirectly toward the persons 151, 152, and 153.

In various embodiments, the dual modality positioning system 110 may be any shape or size and/or may comprise a plurality of distributed components. The illustrated embodiment is merely an example and is not intended to convey any information regarding shape, size, configuration, or functionality. In various embodiments, the dual modality positioning system 110 may include an array of transducers, such as piezoelectric transducers, configured to transmit and/or receive ultrasound and/or electromagnetic radiation. The dual modality positioning system 110 may be configured with a first plurality of transducers 112 (or a single transducer) for transmitting ultrasound and/or electromagnetic radiation and a second plurality of transducers 113 (or a single transducer) for receiving ultrasound.

Figure 1B:
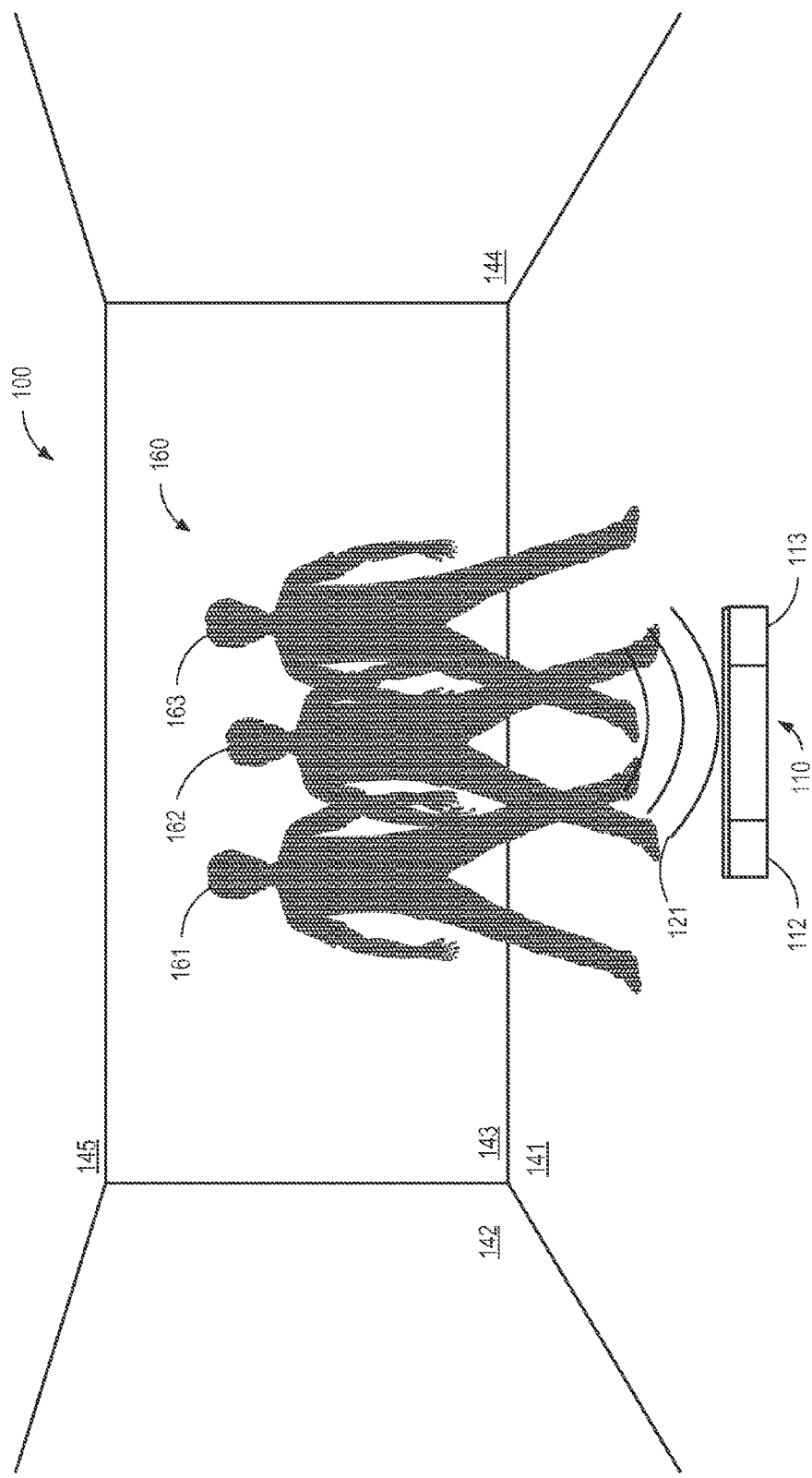
FIG. 1B illustrates a direct ultrasonic reflection received by the positioning system and the resulting "image" generated by the positioning system.

FIG. 1B illustrates a direct ultrasonic reflection 121 received by the dual modality positioning system 110. As illustrated, the direct ultrasonic reflection 121 may convey coarse image information in a relatively two-dimensional fashion in which the three persons 151, 152, and 153 are viewed as a single object 160, or as three distinct objects (161, 162, and 163) in substantially the same plane. FIG. 1B illustrates a visual representation of the received direct reflection of ultrasound 121. The actual positional data received may be at a higher or lower resolution depending on the sampling rates, accuracy, processing bit depth, frequency(ies) of ultrasound used, etc.

Figure 2A:
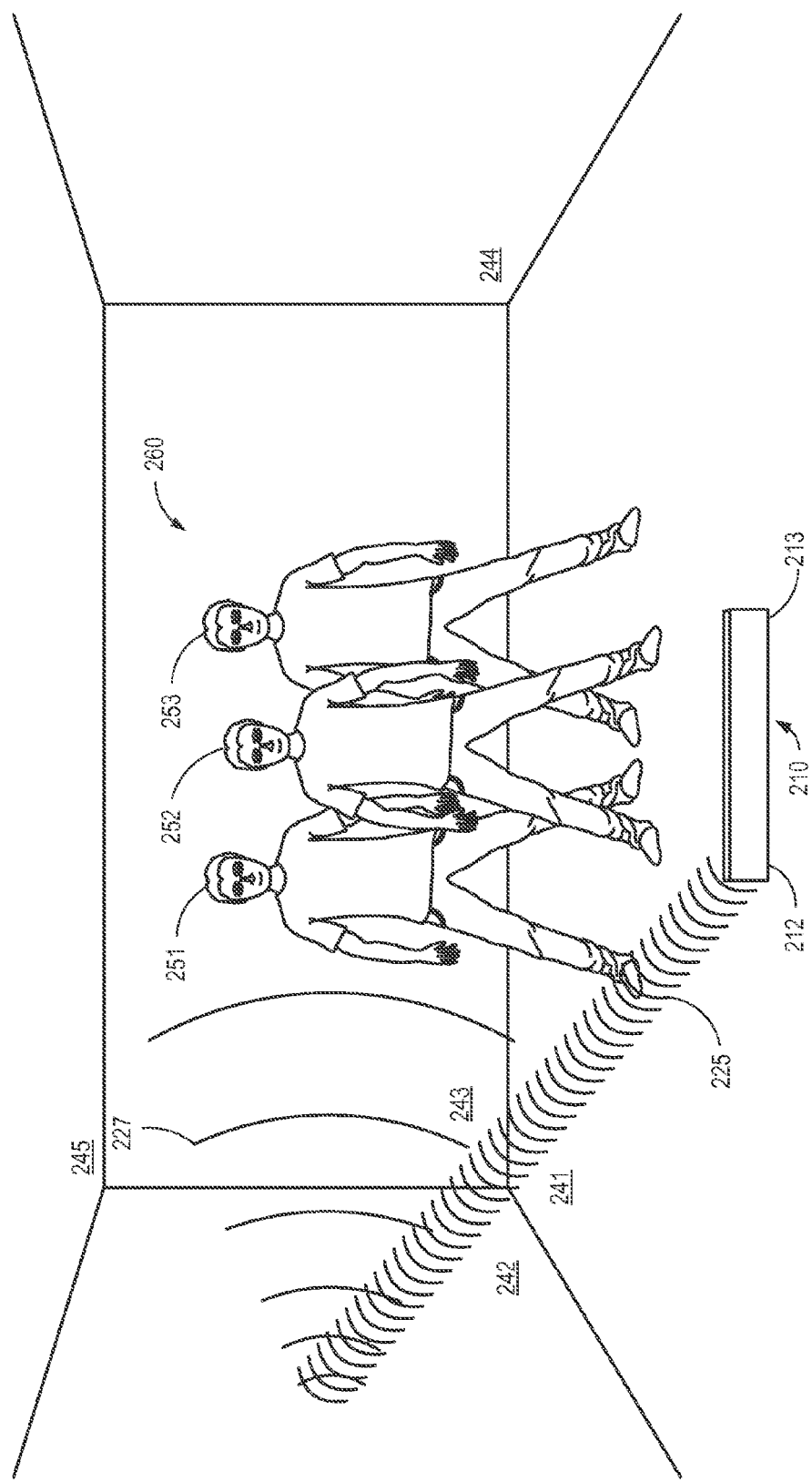
FIG. 2A illustrates a positioning system rebounding ultrasound off the wall and then toward the three persons.

FIG. 2A illustrates a dual modality positioning system 210, similar to that described in conjunction with FIGS. 1A and 1B, in which ultrasound 225 is transmitted toward a surface bounding the region 200. In the illustrated embodiment, the rebounding surface is left wall 242. It is appreciated that ultrasound may be rebounded off one or more of left wall 242, floor 241, back wall 243, right wall 244, and/or ceiling 245. Similarly, electromagnetic radiation may be rebounded off one or more of left wall 242, floor 241, back wall 243, right wall 244, and/or ceiling 245. In some embodiments, the system may receive electromagnetic radiation from other sources (e.g., ambient light in the region).

As used herein, the terms rebound and rebounding may include any type of reflection, refraction, and/or repeating that may or may not include a phase, frequency, modulation, and/or amplitude change. Rebounding may be performed by the outer surface of the surface, an inner portion of the surface, or an object disposed on, in, or behind the surface (e.g., exterior paint, drywall, internal metal, studs, interior coatings, mounted panels, etc.).

The ultrasound may ultimately be rebounded 227 to reflect off persons 251, 252, and 253 at a different angle than that obtained in FIGS. 1A and 1B. The illustrated embodiment shows the rebounded ultrasound 227 reflecting off the left wall 242 prior to the persons 251-253. However, the ultrasound may reflect off persons 251-253 prior to the left wall 242 instead. Ultimately, ultrasound 225 may be rebounded and/or reflected by persons 251-253 and one or more of surfaces/walls 241-245 in any order and then be received by positioning system 210.

Figure 2B:
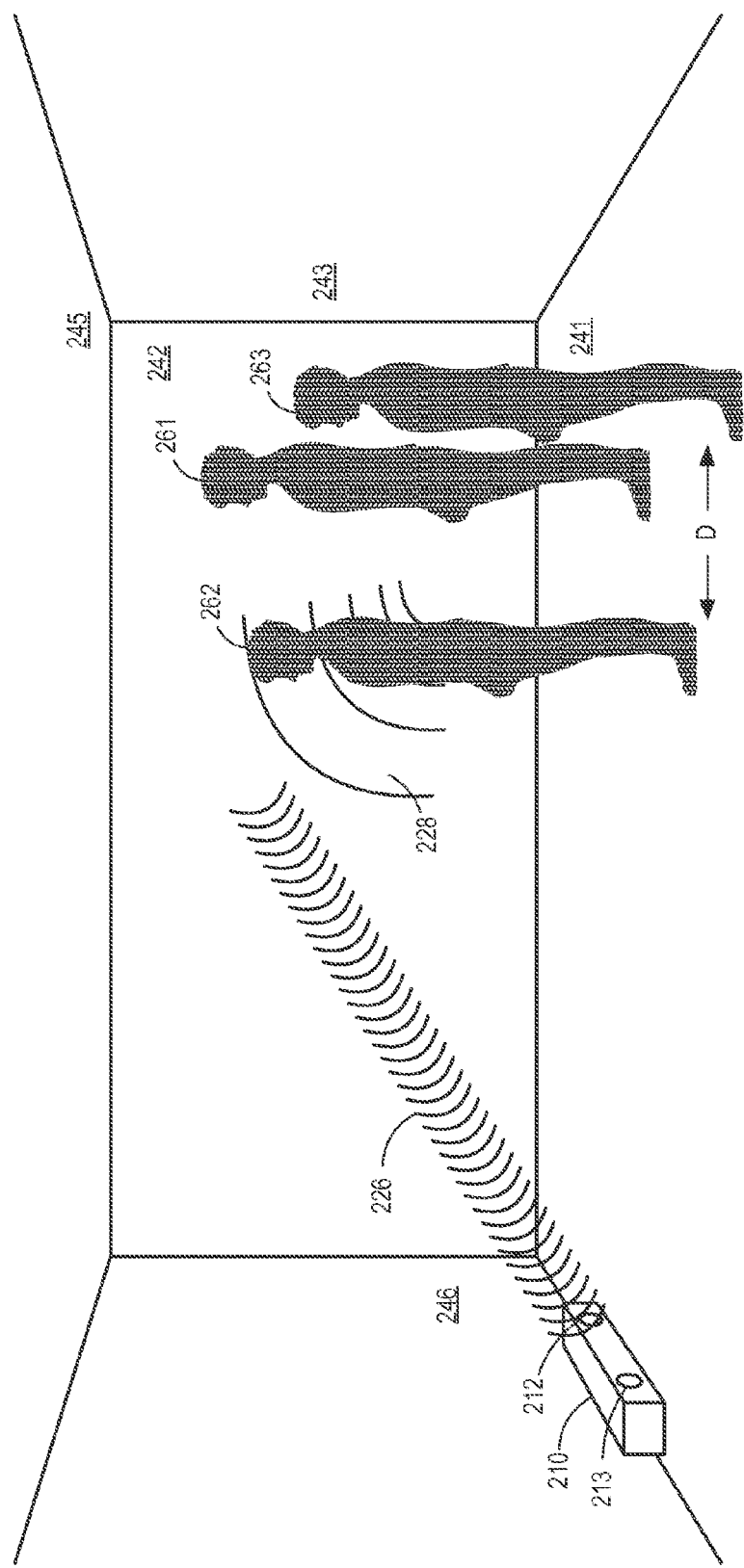
FIG. 2B illustrates a side view of the positioning system rebounding the ultrasound off the wall and then toward the three persons.

FIG. 2B illustrates a side view of the dual modality positioning system 210 described in conjunction with FIG. 2A with the rebounded ultrasound 226 being received after reflecting off persons 251-253, at location 228, and rebounding off left wall 242. FIG. 2B also shows a front wall 246. In some embodiments, all of the ultrasound may be transmitted against a front wall 246 to more evenly distribute ultrasound throughout the region (i.e., a wider effective beam width).

As illustrated in FIG. 2B, the positional data obtained by the rebounded ultrasound 226 may provide coarse image information not available via the direct reflections shown in FIGS. 1A and 1B, e.g., due to one object preventing direct ultrasound from reaching a second object (or another portion of the first object). For instance, the visual representation of the positional data obtained illustrates three distinct objects 261, 262, and 263 that are clearly in distinct planes relative to the dual modality positioning system 210. For instance, the positional data generated based on the rebounded ultrasound in FIG. 2B shows a distance D between object 262 and objects 261 and 263. Such a distance D may be difficult to determine or determined differently if only direct reflections were available (as in FIGS. 1A and 1B).

FIG. 3A illustrates a plurality of ultrasonic and/or electromagnetic radiation reflectors 371, 372, 373, and 374 secured to, mounted to, positioned within, and/or integrally formed with one or more of the surfaces 341, 342, 343, 345, and 346. In some embodiments, a user/subject may hold or otherwise control a portable ultrasonic and/or electromagnetic radiation reflector 375. The ultrasonic reflectors 371-375 may facilitate the transmission, reflection, and/or reception of rebounded ultrasound by the dual modality positioning system 310.

The ultrasonic and/or electromagnetic radiation reflectors may comprise passive, active, and/or actively moved/pivoted ultrasonic reflectors for controlling the direction in which ultrasound rebounds and/or otherwise travels within the region. For example, the ultrasonic and/or electromagnetic radiation reflector may be configured to modify one or more of the frequency, phase, and/or amplitude of the rebounded ultrasound and/or electromagnetic radiation. The modified characteristic may facilitate the differentiation of the direct ultrasonic and/or electromagnetic radiation reflections and the rebounded ultrasonic and/or electromagnetic radiation reflections.

The dual modality mapping or positing system 310 may generate positional data associated with one or more of the object(s) based on the direct ultrasonic and/or electromagnetic radiation reflection(s) (e.g., FIGS. 1A and 1B) and/or the rebounded ultrasonic and/or electromagnetic radiation reflection(s) (e.g., FIGS. 2A and 2B). The positional data may comprise a centroid of the objects, a two-dimensional mapping of the object, an image of the object, a false-color representation of the object, an information representation (blocks, squares, shadows, etc.) of the object, a three-dimensional mapping of the object, one or more features of the object, and/or other information. The positional data generated via one modality (i.e., the ultrasonic or the electromagnetic radiation) may be at a higher or lower resolution that the positional data generated by the other modality.

The positional data may be defined with respect to one or more surfaces of the region, the dual modality positioning system 310, a receiver of the positioning system 312, and/or a transmitter 313 of the positioning system. The one or more objects within the region may comprise machinery, robots, furniture, household property, people in general, garners, human controllers of electronic devices, electronic devices, fixtures, and/or other human or non-human objects.

Figure 3B:
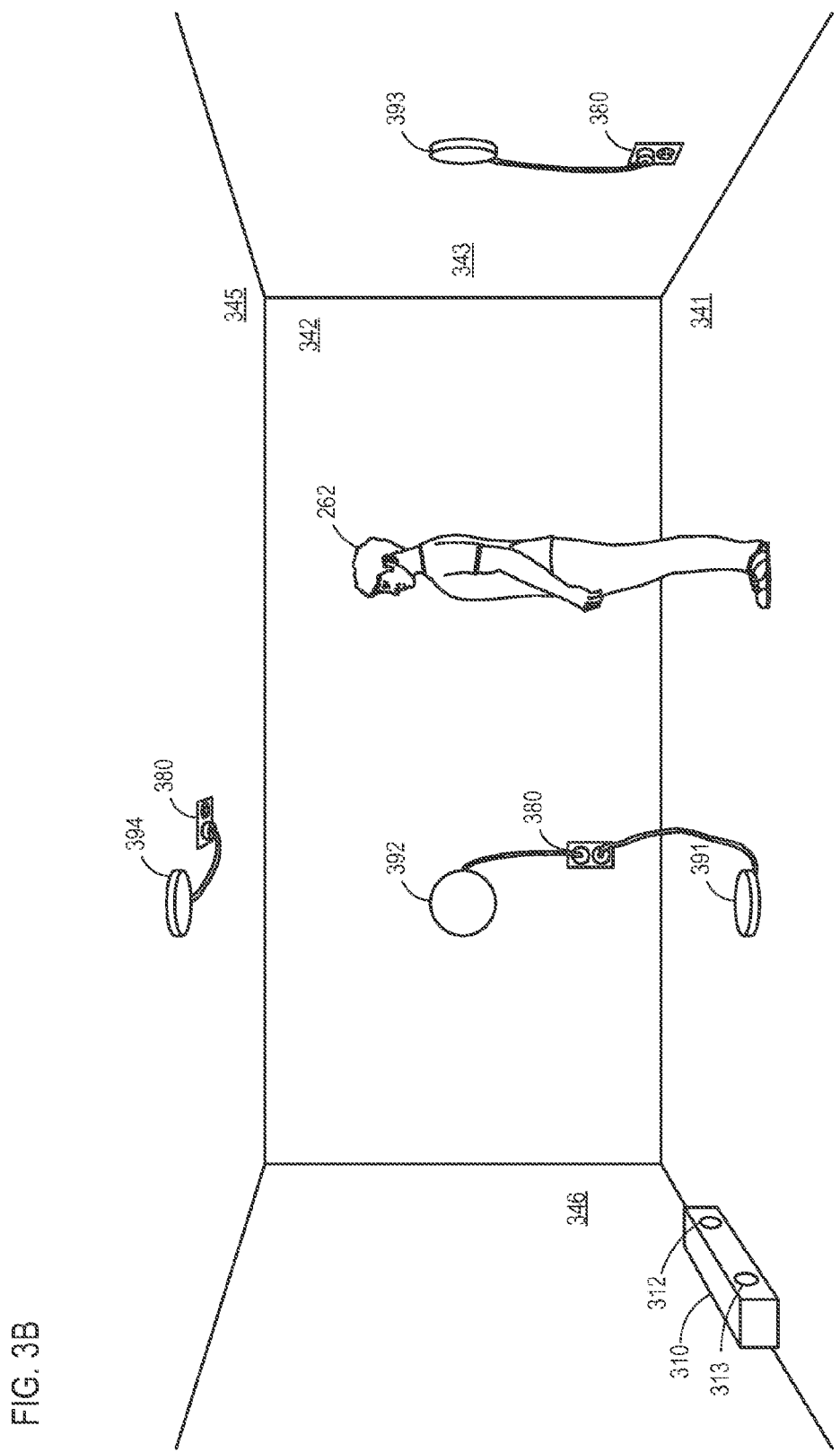
FIG. 3B illustrates a plurality of active ultrasonic reflectors configured to facilitate the transmission, reflection, and/or reception of rebounded ultrasound by the positioning system.

The object may comprise a specific portion of a person, such as a hand, finger, arm, leg, foot, toe, torso, neck, head, mouth, lip, and/or eye. As illustrated in FIGS. 3A and 3B, rebounded ultrasonic transmissions may be reflected off an ultrasonic reflector 371-375 disposed within the room. In some embodiments, the ultrasonic reflectors may modify a characteristic of the reflected ultrasound, facilitating the identification of the received rounded ultrasonic reflections.

FIG. 3B illustrates a plurality of active ultrasonic reflectors 391-394 configured to facilitate the transmission, reflection, and/or reception of rebounded ultrasound by the positioning system. As illustrated, active ultrasonic reflectors 391-394 may be connected to a power source, such as batteries, solar cells, heat converts, outlets 380, and/or other suitable power source. In some embodiments, the ultrasound itself may provide the power source.

Figure 4A:
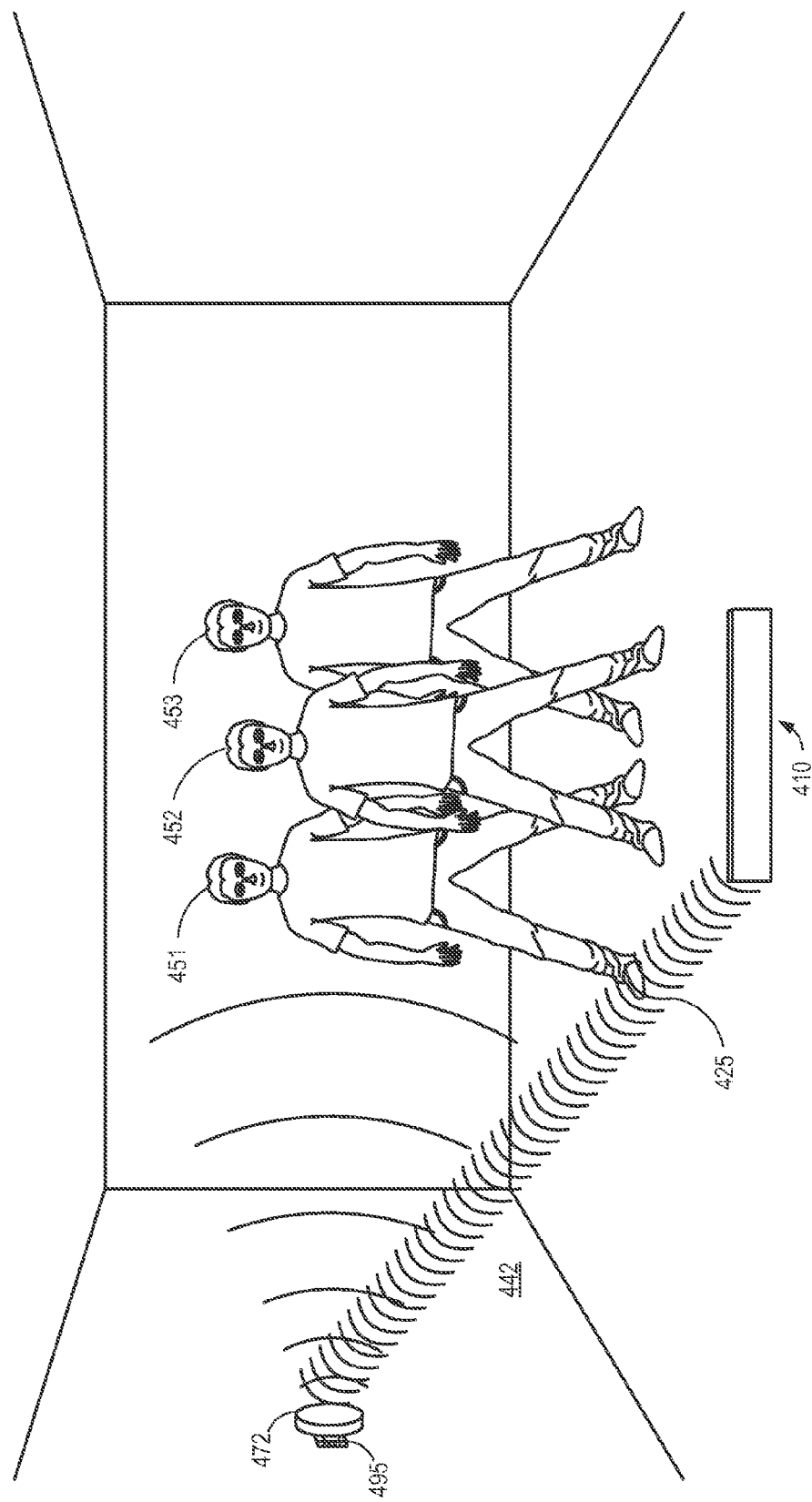
FIG. 4A illustrates an actively controlled ultrasonic reflector in a first position configured to pivot with respect to the wall on which it is mounted to facilitate the transmission, reflection, and/or reception of rebounded ultrasound by the positioning system.

FIG. 4A illustrates an actively controlled ultrasonic reflector 472 in a first position. A dual modality positioning system 410 may be in communication with the ultrasonic reflector 472, or the ultrasonic reflector 472 may be autonomous. In various embodiments, the positioning system 410 may transmit ultrasound 425 toward the persons 451, 452, and 453 or toward the wall 442, as illustrated. The ultrasound 425 may then be rebounded off the wall 442 or reflected by the persons 451-453, respectively.

Figure 4B:
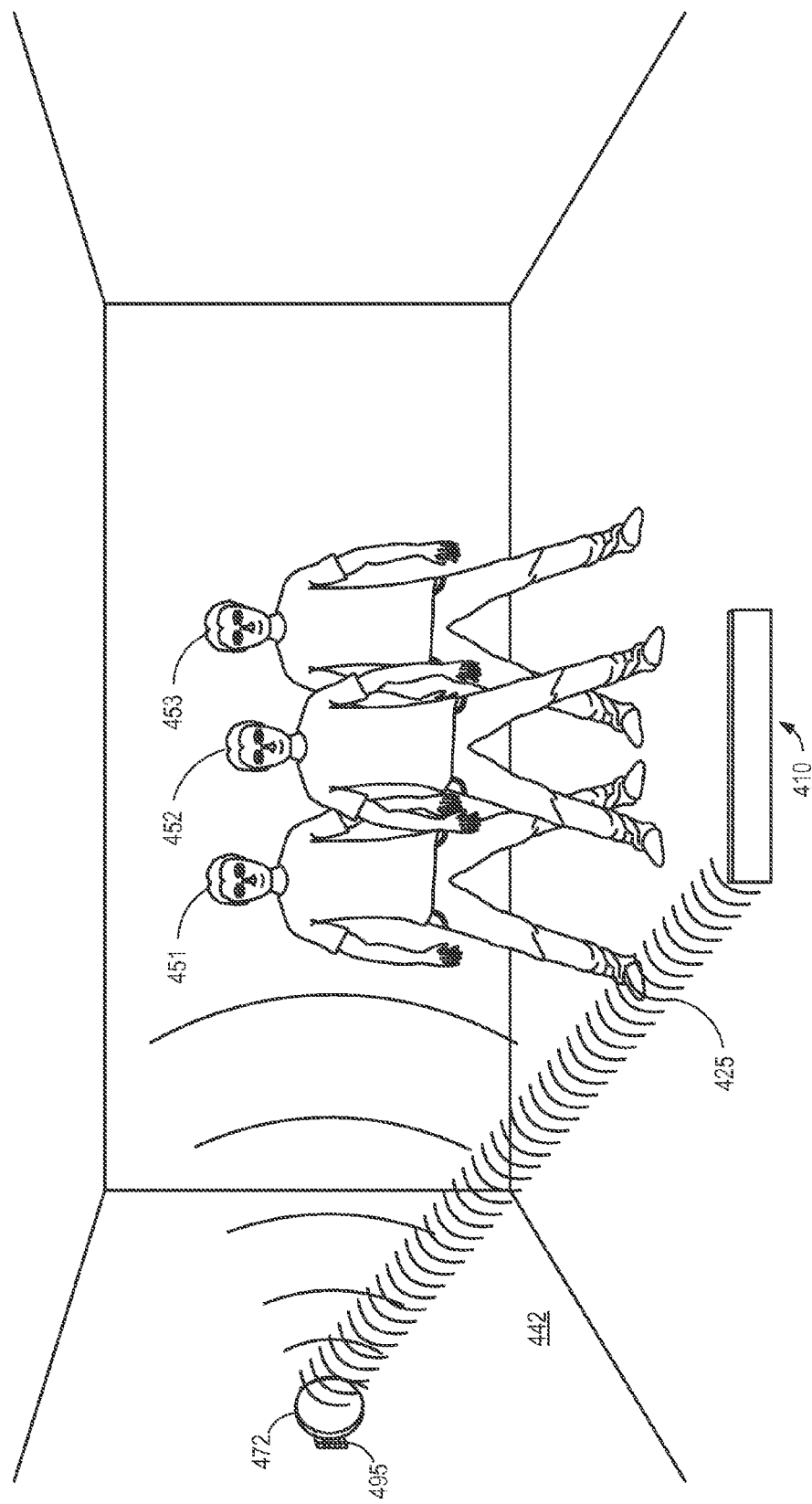
FIG. 4B illustrates the actively controlled ultrasonic reflector in a second position.

FIG. 4B illustrates the actively controlled ultrasonic reflector 472 in a second position. The ultrasonic reflector 472 may be pivoted and/or controlled by a pivot control 495.

In some embodiments, pivot control 495 may change other reflective, absorptive, and/or refractive properties of the ultrasonic reflector 472, in addition to its direction. For example, an ultrasonic reflector 472 may have specific ultrasonic or other acoustic absorptive properties. A pivot control 495 may adjust the pivoting and/or acoustic and/or electrical properties.

Figure 5:
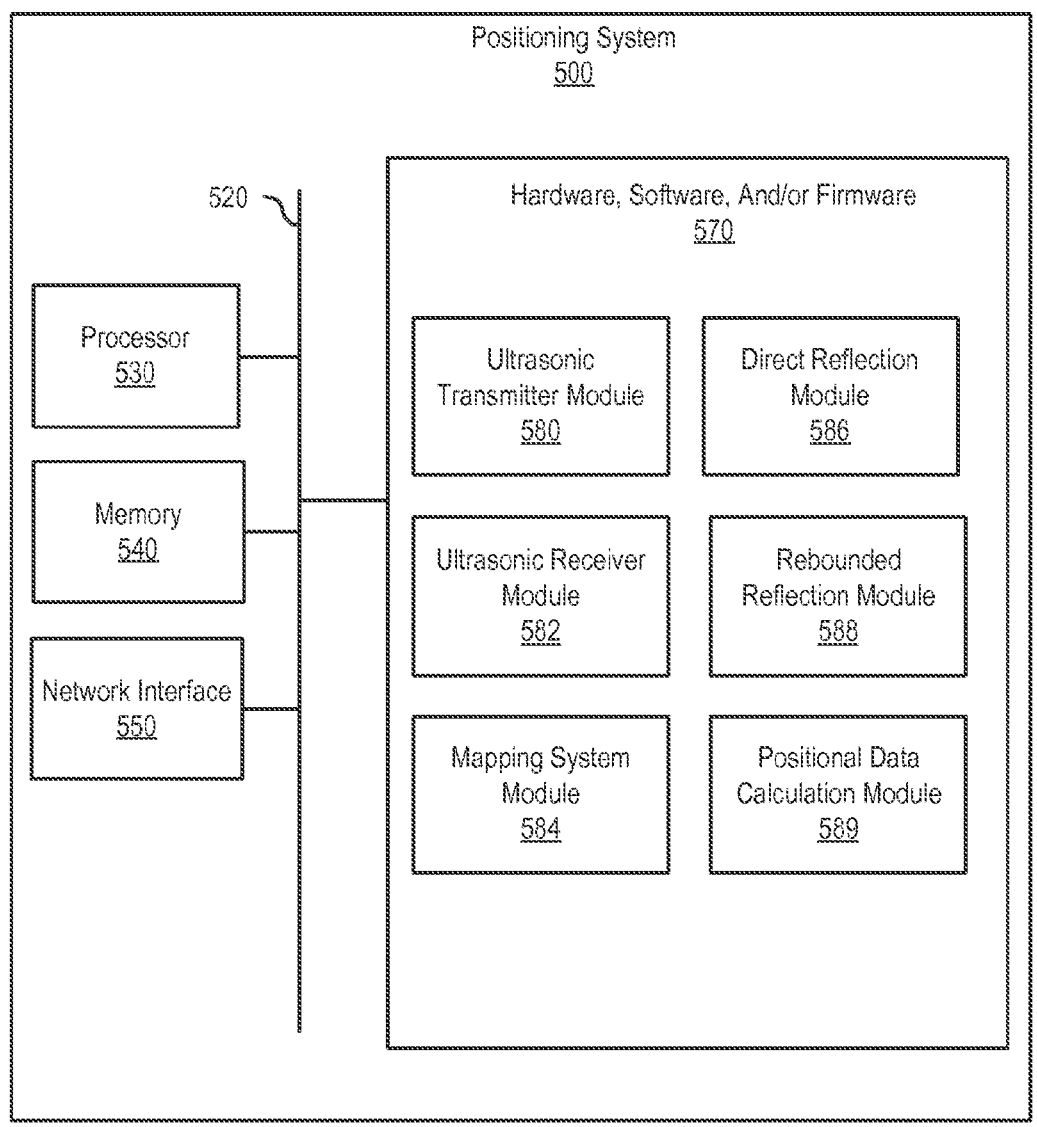
FIG. 5 illustrates a block diagram of a positioning system, according to one embodiment.

FIG. 5 illustrates a block diagram of a positioning system 500, according to one embodiment. As illustrated, a positioning system 500 may include a processor 530, a memory 540, and possibly a network 550 or other data transfer interface. A bus 520 may interconnect various integrated and/or discrete components. Various modules may be implemented in hardware, software, firmware, and/or a combination thereof.

An ultrasonic transmitter module 580 may be configured to transmit ultrasound in any of the various forms and/or methods described herein. An ultrasonic receiver module 582 may be configured to receive a direct ultrasonic reflection from an object within a region. Additionally, the ultrasonic receiver module 582 may be configured to receive rebounded ultrasonic reflection from the object. As used herein, direct reflections and rebounded reflections refer to the various descriptions provided herein as well as the generally understood and variations of these terms.

A mapping system module 584 generates direct positional data associated with the object based on one or more direct ultrasonic reflections. The mapping system module 584 may also generate direct positional data associated with the object based on one or more indirect ultrasonic reflections, as may be understood in the art. The mapping system module 584 may also generate rebounded positional data associated with the object based on one or more indirect ultrasonic reflections, as may be understood in the art.

A direct reflection module 586 may be configured to facilitate, manage, and/or monitor the transmission and/or reception of direct reflections. The rebounded reflection module 588 may be configured to facilitate, manage, and/or monitor the transmission and/or reception of rebounded reflections.

The positional data calculation module 589 may generate direct positional data associated with the object based on one or more direct ultrasonic reflections. The positional data calculation module 589 may also generate rebounded positional data associated with the object based on one or more rebounded ultrasonic reflections. The positional data calculation module 589 may also generate enhanced positional data by combining the direct positional data and the rebounded positional data.

Figure 6:
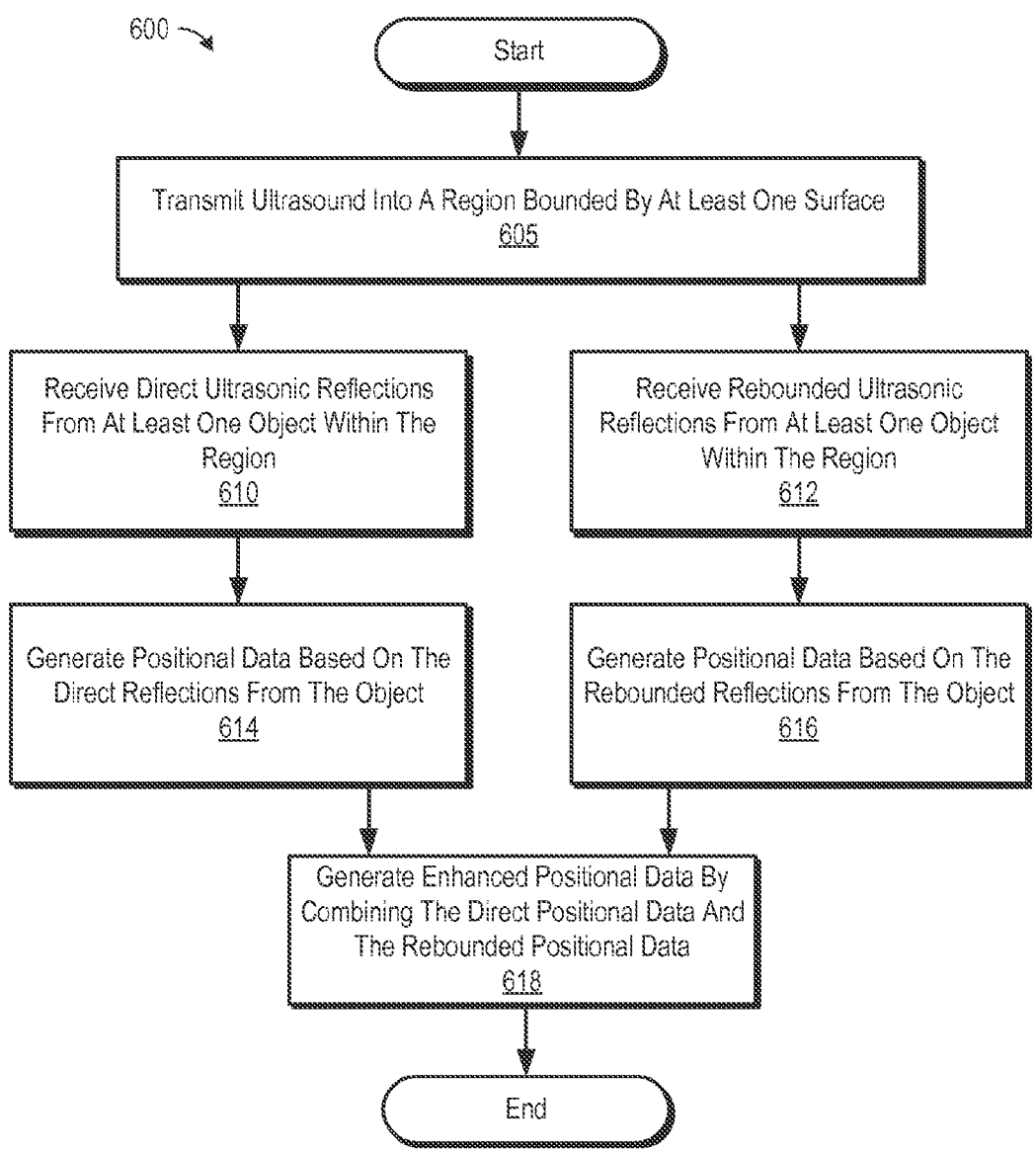
FIG. 6 illustrates a flow chart of a method for generating positional data describing a relative position of one or more objects within a region.

FIG. 6 illustrates a flow chart of method 600 for generating positional data describing a relative position and/or movement of one or more objects within a region. The method steps are provided in no particular order and may be rearranged as would be technically feasible. A positioning system may transmit 605 ultrasound into a region bounded by at least one surface. The positioning system may receive 610 direct ultrasonic reflections from at least one object within the region.

The positioning system may receive 612 rebounded ultrasonic reflections from at least one object within the region. The rebounded ultrasonic reflections may reflect off the wall(s) first and/or off the object(s) first. The positioning system may generate 614 positional data based on the direct reflections from the object. The positioning system may generate 616 positional data based on the rebounded reflections from the object.

The positioning system may generate 618 enhanced positional data by combining the direct positional data and the rebounded positional data. In other embodiments, the positioning system may transmit the direct positional data and the rebounded positional data to another electronic or other processing device for usage.

Any of the various configurations of ultrasonic transmitters, receivers, reflectors, and/or other components described in conjunction with the detection of the position of an object may also be applied to the embodiments described herein with respect to the detection and/or calculation of velocity and/or acceleration data associated with an object or objects, including those embodiments described below with reference to FIGS. 7A-12. For example, direct and rebounded reflections, multiple reflectors and/or ultrasonic paths may be used to calculate velocity and/or acceleration data associated with an object within a region.

Figure 7A:
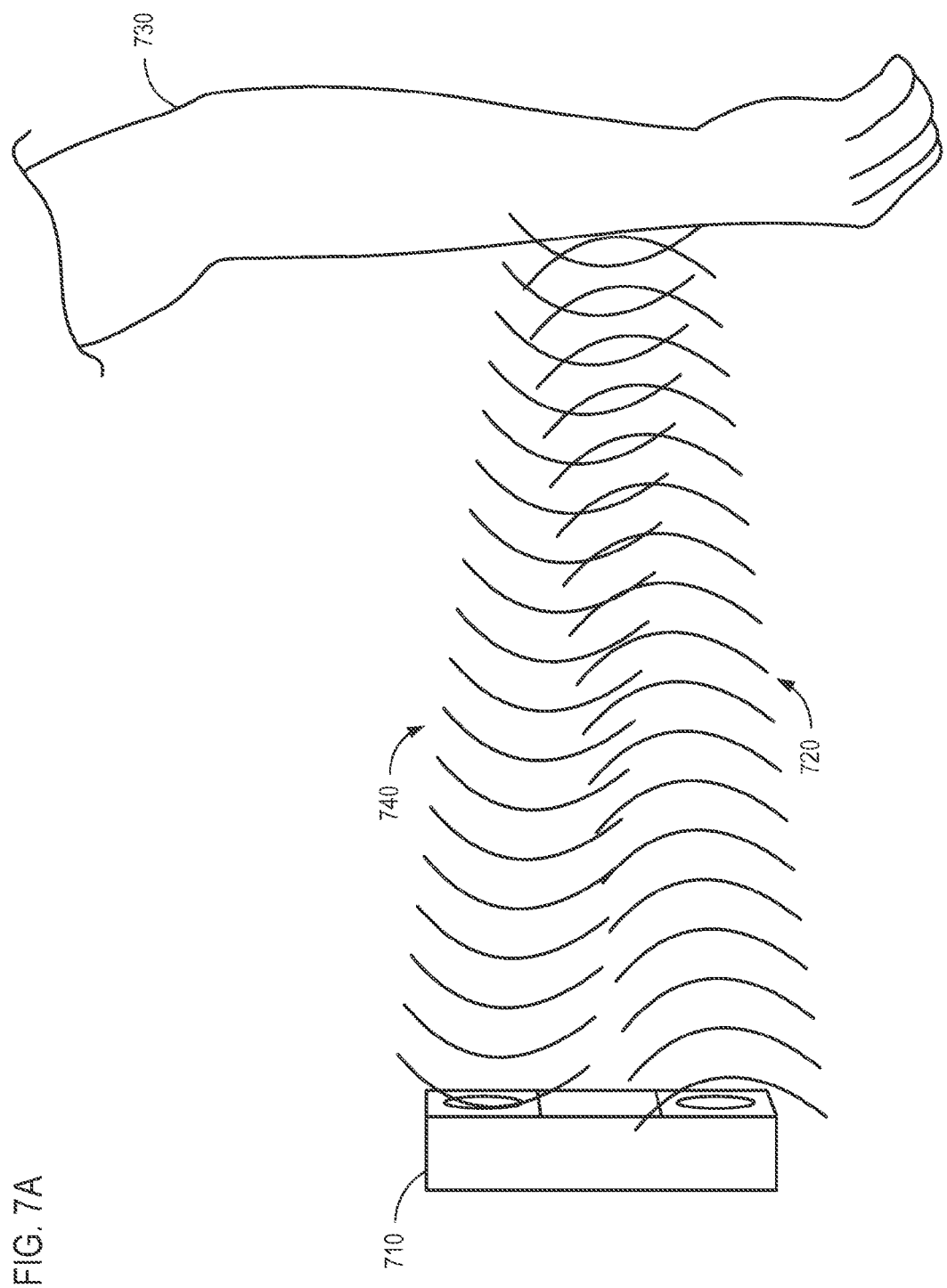
FIG. 7A illustrates an ultrasonic system transmitting and receiving reflected ultrasound from a stationary object.

FIG. 7A illustrates an ultrasonic system 710, which can be used as part of a dual modality system, transmitting 720 and receiving 740 reflected ultrasound from a stationary object 730. The spacing between the arcs representing the ultrasound 720 and 740 is representative of the wavelength and/or frequency of the ultrasound. With the object 730 in a stationary position, the reflected ultrasound 740 is not shifted with respect to the transmitted ultrasound 720.

Figure 7B:
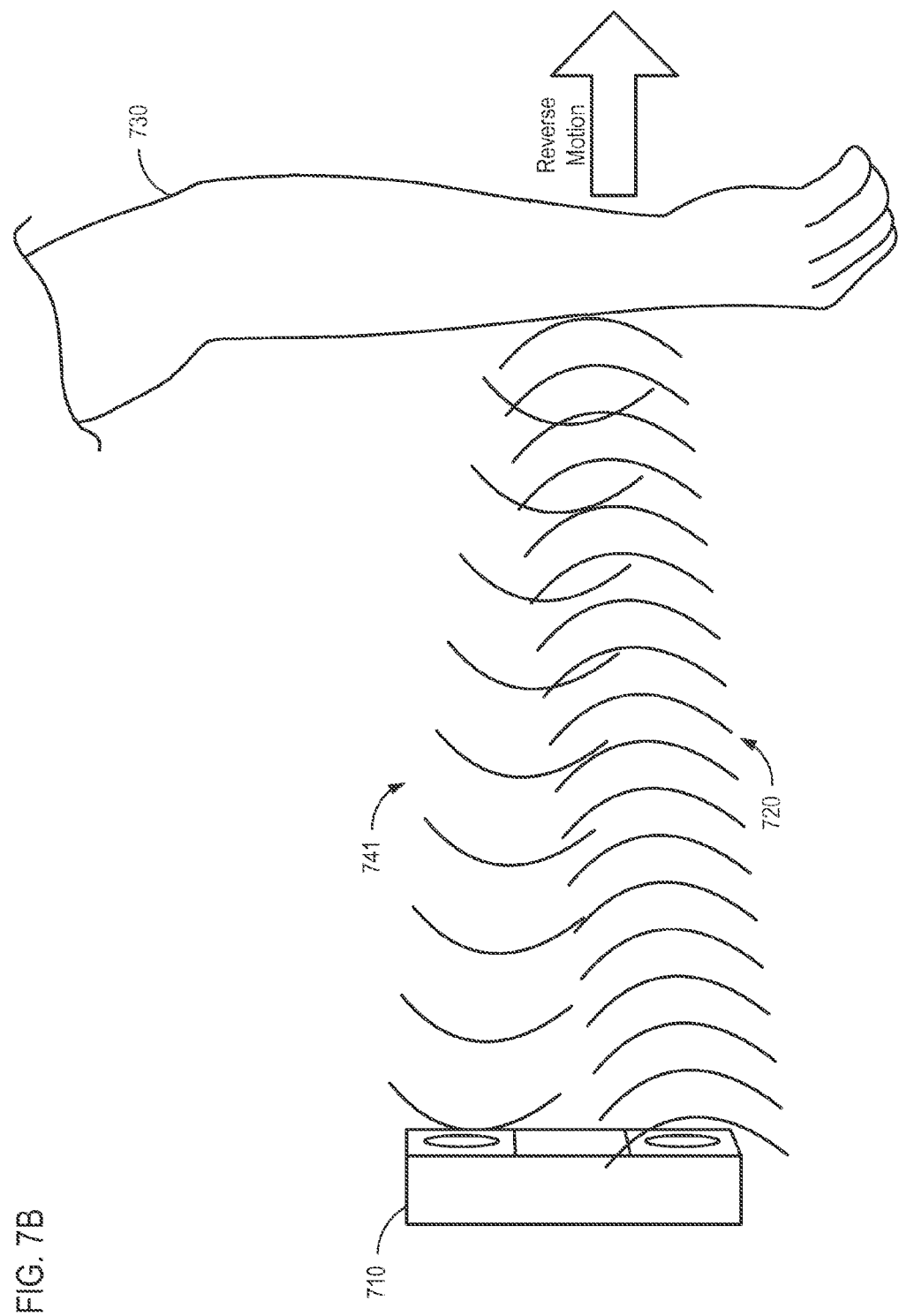
FIG. 7B illustrates an ultrasonic system transmitting ultrasound at a first frequency and receiving reflected ultrasound at a second frequency from an object moving away from the ultrasound system.

FIG. 7B illustrates the ultrasonic system 710 transmitting ultrasound 720 at a first frequency and receiving reflected ultrasound 741 at a second frequency from an object moving away from the ultrasound system 710. The frequency shift can be detected and used to determine the velocity of the reverse motion of the object 730. For example, the velocity of the object 730, $V_o$, is equal to the change in frequency, $\Delta f$, multiplied by the velocity of the ultrasound, $V_{us}$, divided by the frequency of the transmitted ultrasound, $f_{trans}$, relative to the ultrasonic receiver. Any of a wide variety Doppler shift velocity and/or acceleration calculation and/or estimation algorithms may be utilized.

Figure 7C:
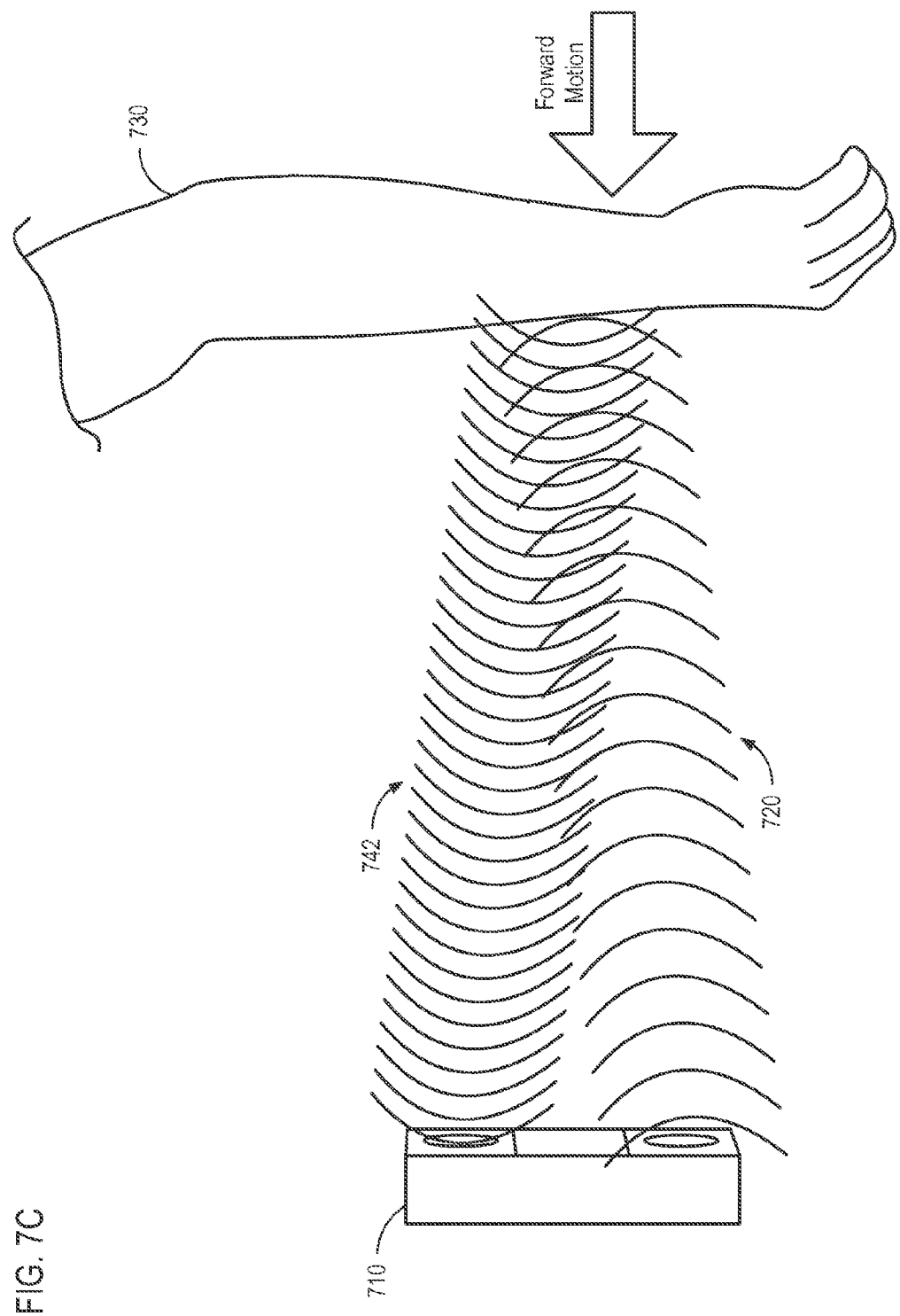
FIG. 7C illustrates an ultrasound system transmitting ultrasound at a first frequency and receiving reflected ultrasound at a second frequency from an object moving toward the ultrasound system.

FIG. 7C illustrates an ultrasound system 710 transmitting ultrasound 720 at a first frequency and receiving reflected ultrasound 742 at a second frequency from an object 730 moving toward the ultrasound system 710. Again, any of a wide variety of Doppler shift algorithms for calculating, determining, and/or estimating the relative velocity of the object 730 with respect to the ultrasonic system 710 may be used. For example, the Doppler equation:

$$f_r = \left(\frac{C + V_r}{C + V_o}\right) f_t \qquad \text{Equation 1}$$

In equation 1 above it is assumed that a transmission medium (e.g., air) is relatively stationary, $f_r$ is the frequency of the received ultrasound, C is the velocity of the ultrasound in the medium (e.g., air), $V_r$ is the velocity of the ultrasonic receiver relative to the medium, $V_o$ is the velocity of the object relative to the medium, and $f_t$ is the frequency of the transmitted ultrasound. An acceleration of the object may be determined using velocity calculations at multiple discrete time periods and/or by detecting a change in the frequency of the received ultrasound, $f_r$, over time.

As described herein, the ultrasonic system 710 may include one or more ultrasonic transmitters and/or ultrasonic receivers and the transmitters and receivers may be physically joined (as illustrated in FIG. 7C) or they may be separated and even possible positioned in disparate locations within the region. In some embodiments, the transmitters and receivers may be embodied in a single transducer. In other embodiments, each transducer may act as both an ultrasound transmitter and an ultrasound receiver. In yet other embodiments each transducer may be used in conjunction with an electromagnetic position detection system and/or receiver system as a dual modality system.

Figure 7D:
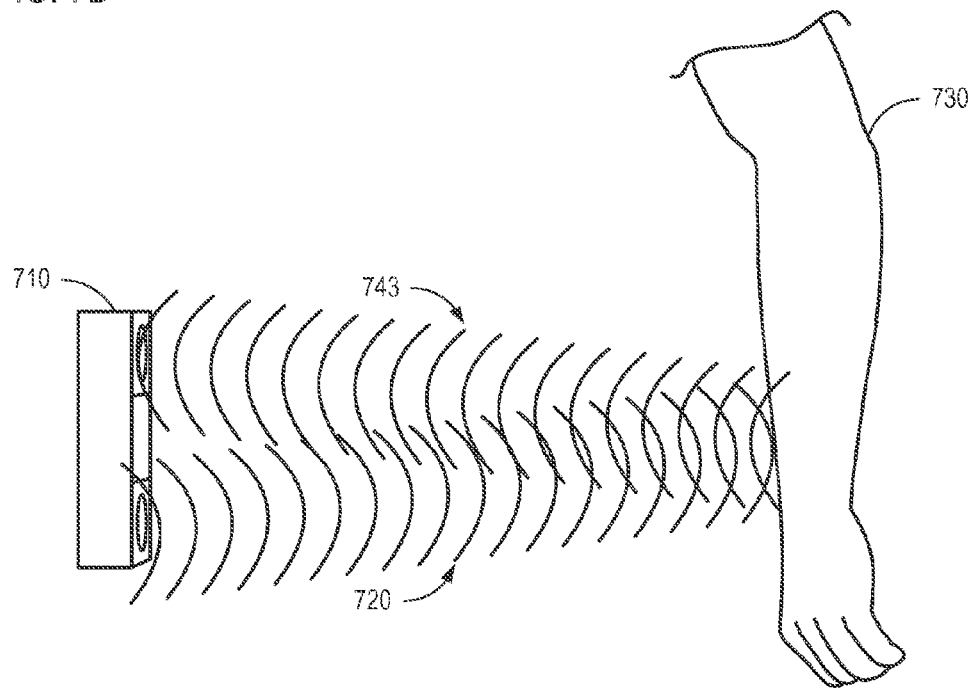
FIG. 7D illustrates an ultrasonic system transmitting and receiving reflected ultrasound from a stationary object, similar to FIG. 7A.

FIG. 7D illustrates an ultrasonic system 710 transmitting and receiving reflected ultrasound 720 and 743 from a stationary object 730, similar to FIG. 7A. FIG. 7D provides a representative context for FIG. 7E.

Figure 7E:
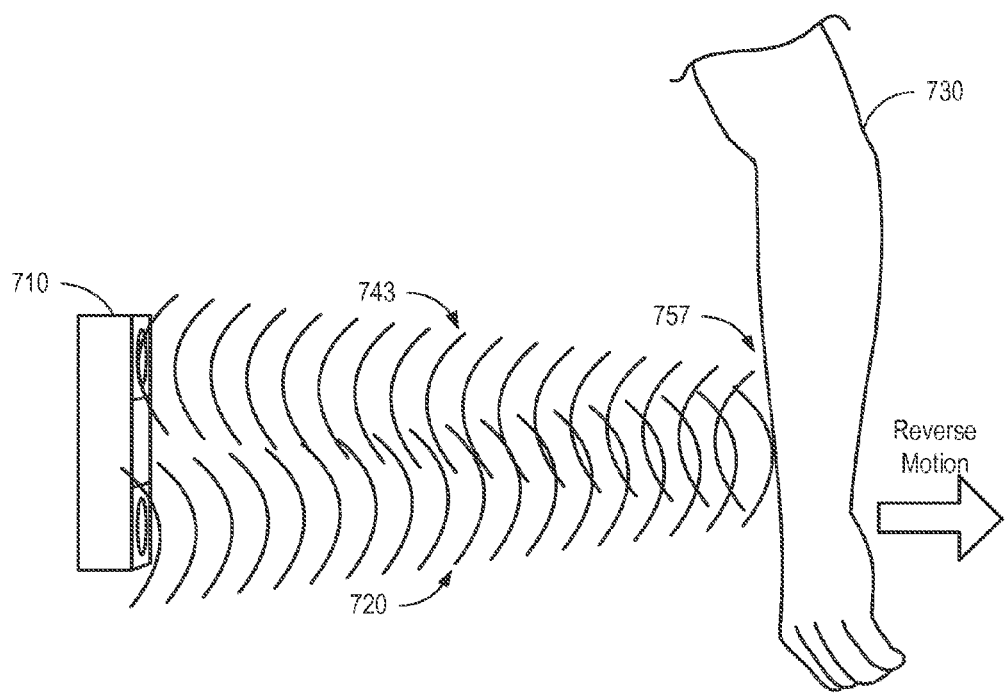
FIG. 7E illustrates a timing delay in a reflected ultrasound from the object as it moves away from the ultrasound system.

FIG. 7E illustrates a timing delay and/or phase shift, illustrated as missing wave arc 757, in reflected ultrasound 743 from the object 730 as it moves away from the ultrasound system 710. As provided herein Doppler shifts may be used to determine acceleration and/or velocity information associated with a moving object. It is, however, recognized the various methods of velocity measurement may be utilized. Including, for example, phase shift (i.e., when received signals arrive) measurements, similar to those used in Doppler echocardiography. It is appreciated that various 1D, 2D, and 3D vector Doppler calculations of velocity and/or acceleration information of an object may be incorporated into the presently described systems and methods, including, but not limited to, 2D Doppler Imaging, Vector Doppler, Speckle Tracking, and others.

Figure 8:
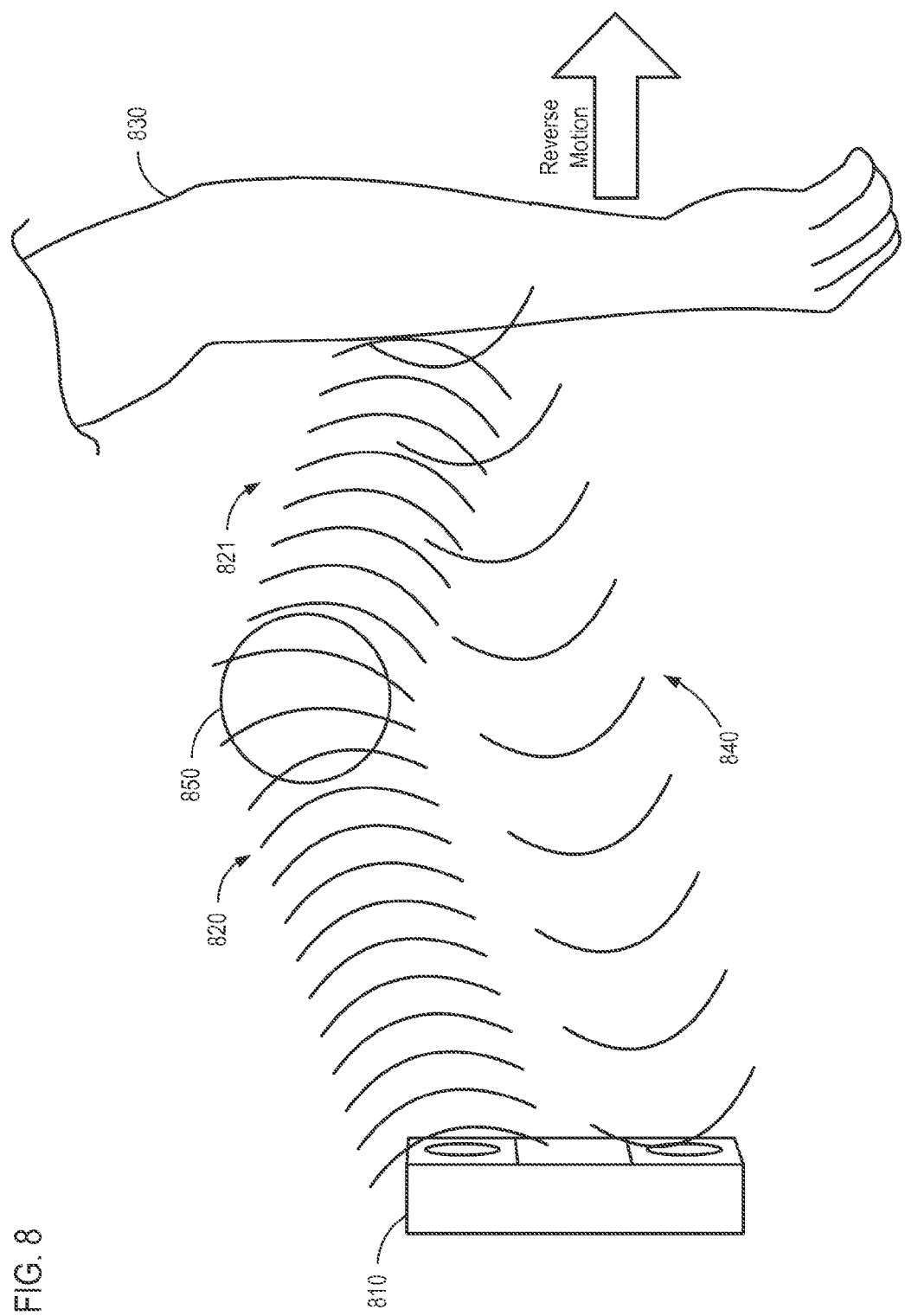
FIG. 8 illustrates ultrasound rebounded off of a reflector prior to being reflected by an object moving away from an ultrasound receiver.

FIG. 8 illustrates ultrasound 820 rebounded, at 821, off of a reflector 850 (e.g., an auxiliary reflector) prior to being reflected by an object 830 moving away from an ultrasound receiver 810. A shift in the received ultrasound 840 relative to the transmitted ultrasound 820 can be used to determine a velocity of the object 830 relative to the ultrasonic receiver 810.

In one embodiment, the ultrasound may first be reflected by the object 830, and then rebounded by the reflector 850. In such an embodiment, it may be possible to determine velocity and/or acceleration information of the object 830 relative to the reflector 850.

Figure 9:
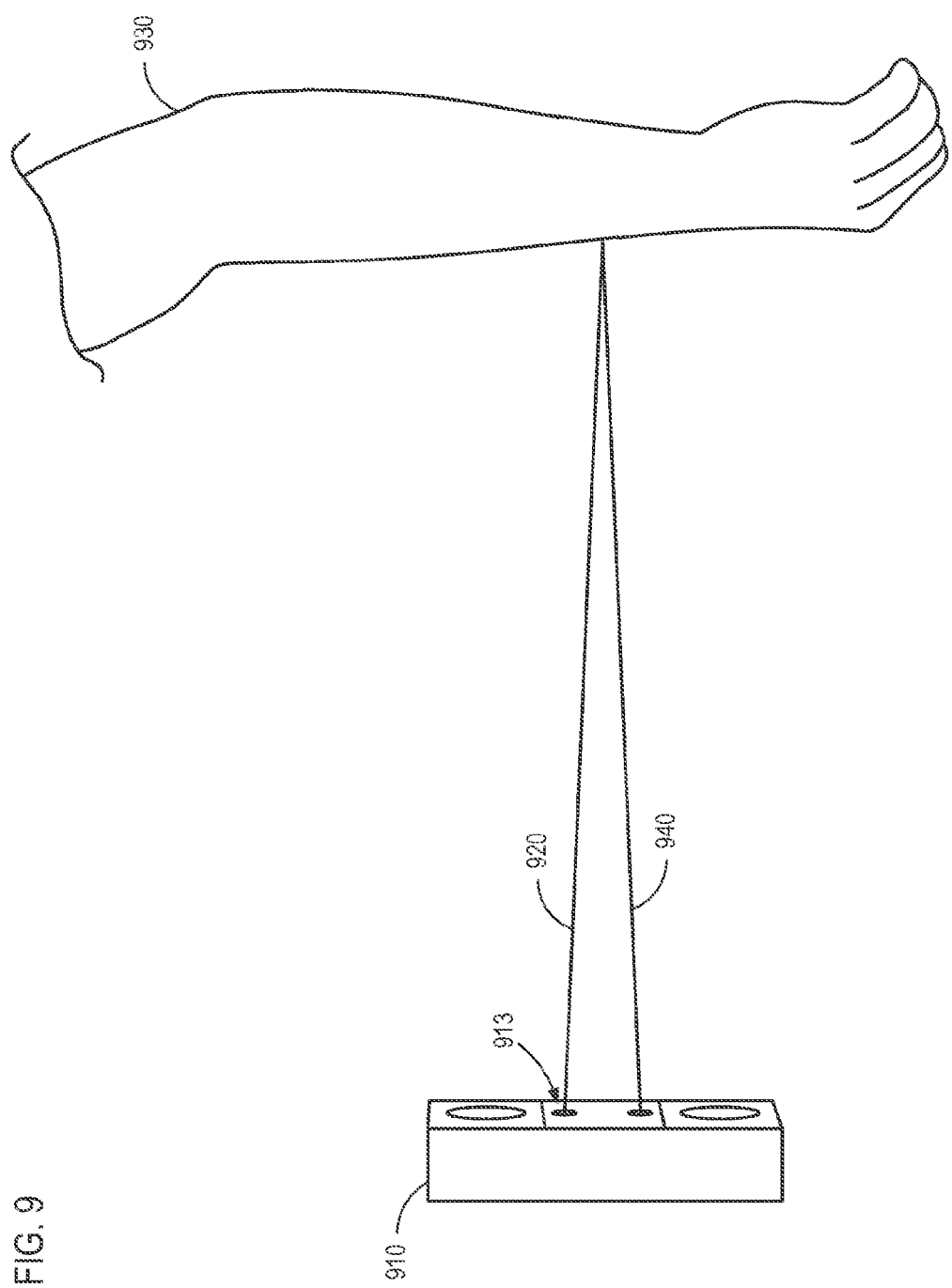
FIG. 9. Illustrates an electromagnetic position detection system used in conjunction with an ultrasound velocity and/or acceleration detection system.

FIG. 9 Illustrates an electromagnetic position detection system 913 used in conjunction with an ultrasound velocity and/or acceleration detection system 910 as a dual modality system. The ultrasonic velocity and/or acceleration detection system 910 may operate and/or be configured in conjunction with any of the various embodiments described herein for determining position, velocity, and/or acceleration information at a current time and/or for estimating such information at a future time. The electromagnetic position detection system 913 may detect a position of the object 930 using time-of-flight. For example, a laser or other electromagnetic radiation source may be used to measure a time-of-flight between the system 913 and the object 930. The position information obtained via an electromagnetic system 913 may be used in conjunction with velocity and/or acceleration data obtained using the ultrasonic system 910 described herein.

Figure 10:
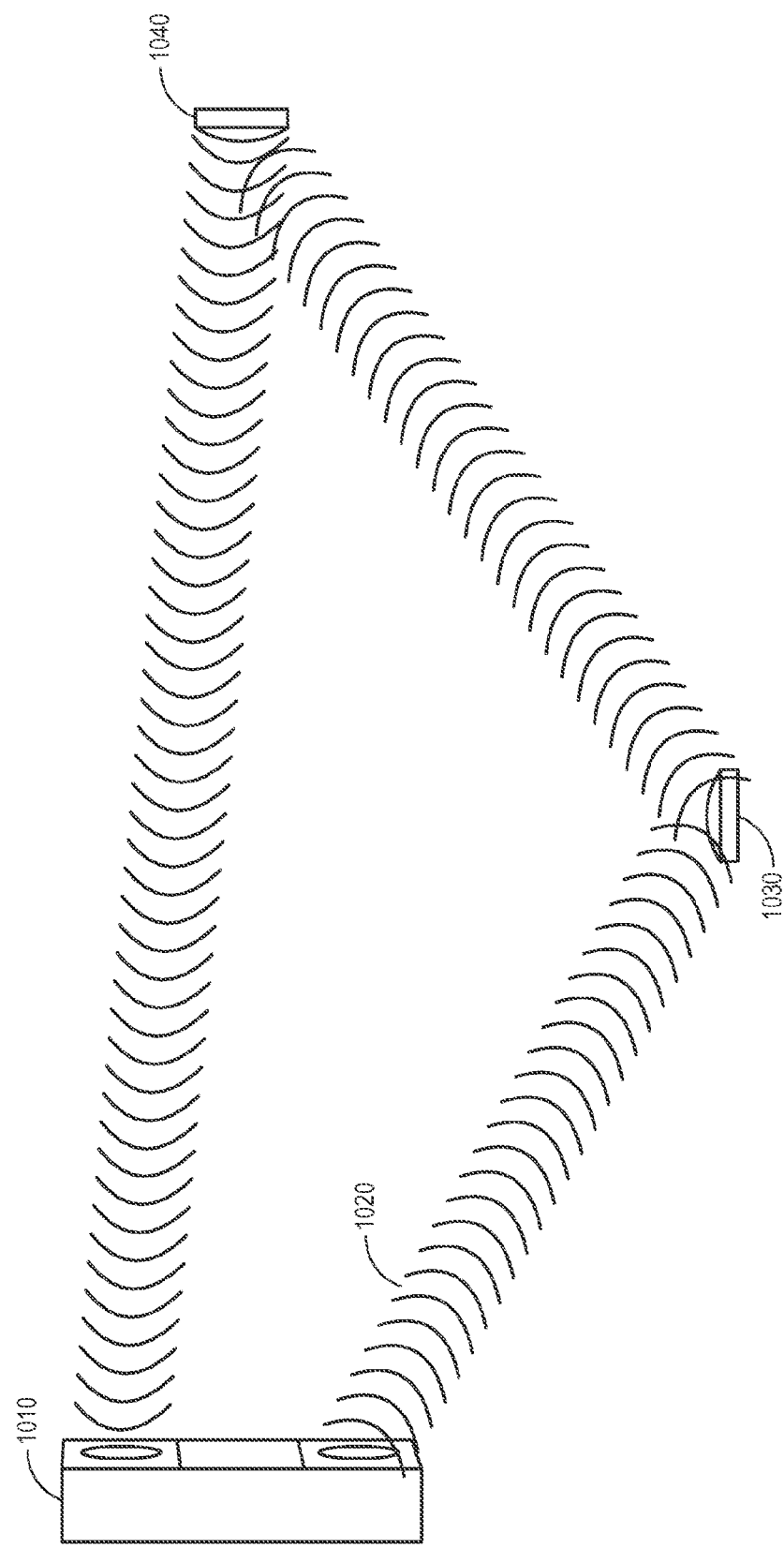
FIG. 10 illustrates ultrasound reflected and/or rebounded from one or more auxiliary reflectors.

FIG. 10 illustrates ultrasound 1020 reflected and/or rebounded from one or more auxiliary reflectors 1030 and 1040. As described in various embodiments, an ultrasound receiver/transmitter 1010 may utilize direct reflections from an object within a region to determine velocity and/or acceleration information based on a detected frequency shift and/or phase shift. In some embodiments, rebounded ultrasonic reflections may be utilized in addition to or instead of direct ultrasonic reflections. Ultrasound reflectors 1030 and 1040 may be active or passive and may be integrated into one or more appliances, walls, or other features of the region. In some embodiments, existing walls, room features, furniture, people, objects, or the like may be identified and/or specified as reflectors 1030 and 1040.

Figure 11:
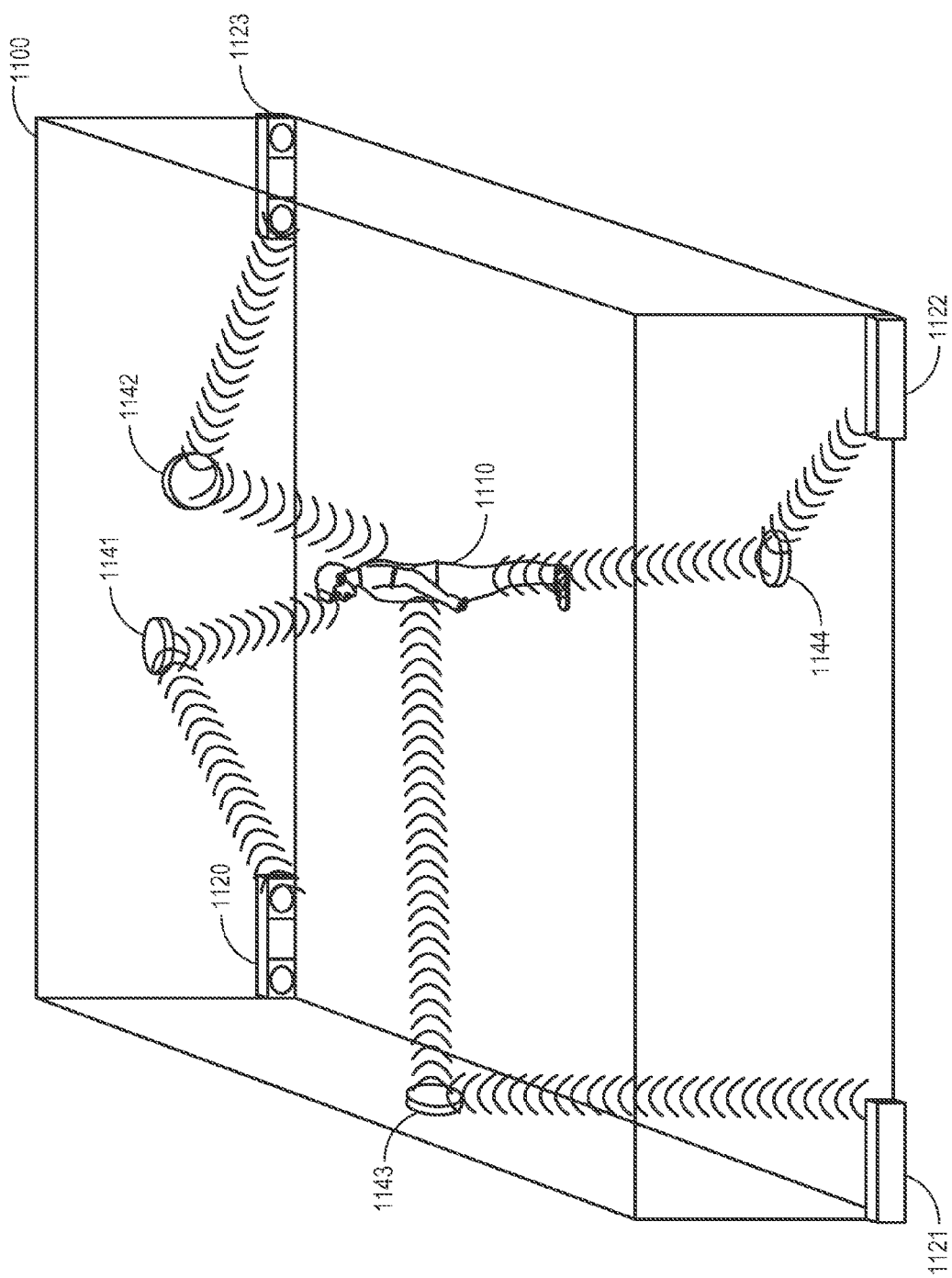
FIG. 11 illustrates a plurality of ultrasonic systems for determining velocity and/or acceleration information from multiple directions.

FIG. 11 illustrates a plurality of ultrasonic systems 1120, 1121, 1122, and 1123 for determining velocity and/or acceleration information from multiple directions relative to the object 1110 or a site on object 1110 within a region 1100. In various embodiments, each ultrasonic system 1120-1123 may include one or more ultrasonic transmitters and one or more ultrasonic receivers. In other embodiments, one or more of the ultrasonic systems 1120-1123 may include one or more ultrasonic transmitters or one or more ultrasonic receivers. In some embodiments, the ultrasonic transmitters and ultrasonic receivers may be separate components spaced apart from one another. As illustrated, the ultrasound may be rebounded off of one or more auxiliary reflectors 141, 142, 143, and 144.

Figure 12:
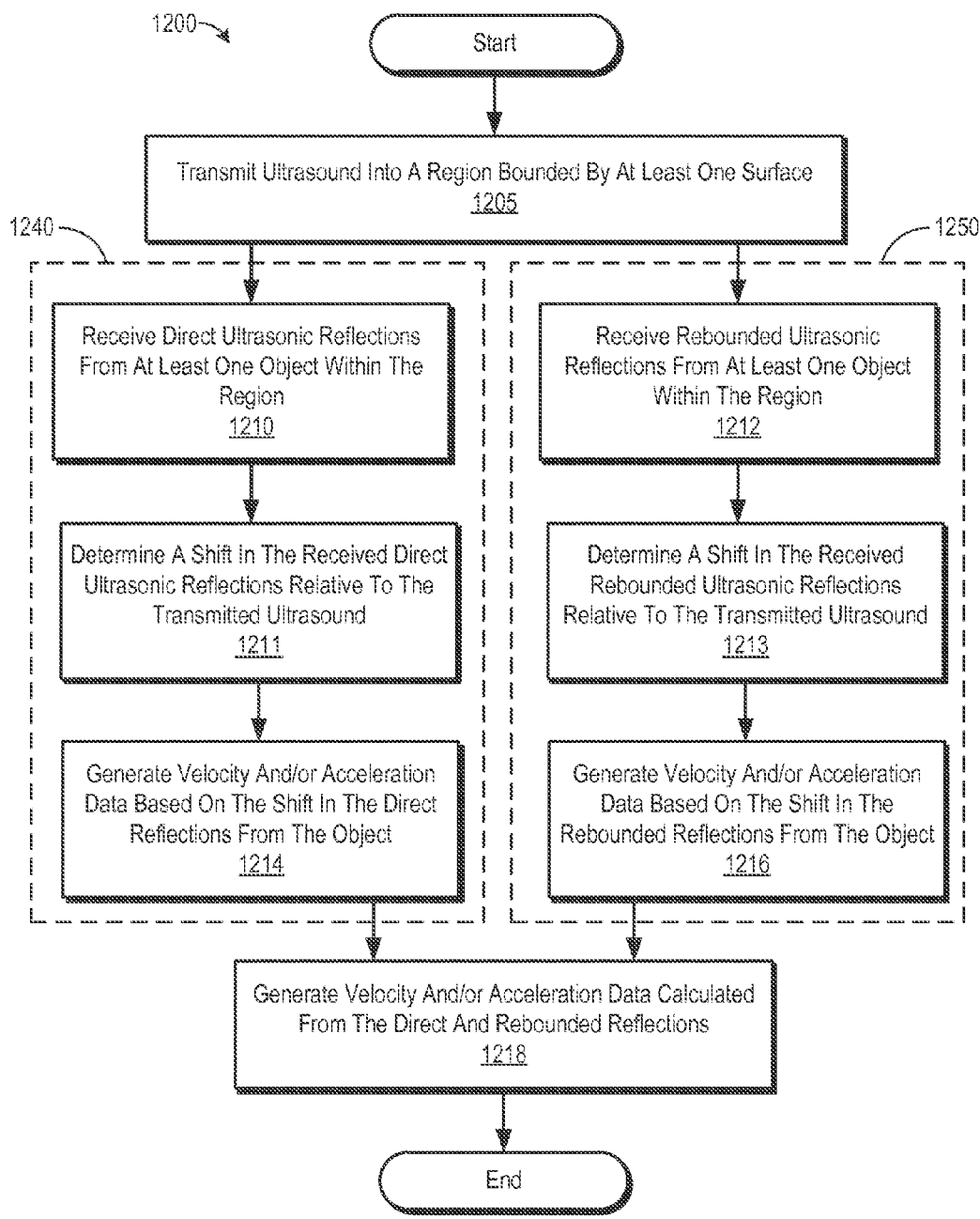
FIG. 12 illustrates a method for determining velocity and/or acceleration information associated with a moving object.

FIG. 12 illustrates a method 1200 for determining velocity and/or acceleration information associated with a moving object. Ultrasound may be transmitted 1205 into a region bounded by at least one surface. Some embodiments may utilize direct reflections from the object to determine velocity and/or acceleration data based on a detected shift in the ultrasound, as provided in block 1240. A receiver may receive 1210 direct ultrasound reflections from at least one object or a site on an object within the region. A shift, such as a wavelength shift, frequency shift, or phase shift, may be determined 1211 between the transmitted ultrasound and the received ultrasound. The system may then generate 1214 velocity and/or acceleration data based on the detected shift.

It is understood that "determining a shift," "detecting a shift," "calculating a shift," and the like may not necessarily require an actual determination of the difference between the, e.g., frequency, of the transmitted and received ultrasound. That is, "detecting a shift" and similar phrases may be constructively performed during a Doppler calculation of velocity and/or acceleration. For example, "detecting a shift" may be constructively performed if a velocity of an object is determined using (1) a known/measured frequency of transmitted ultrasound and (2) a known/measured frequency of ultrasound reflected by the object. The system may or may not actually calculate the frequency difference between the transmitted and received ultrasound, as various derivative and equal algorithms for Doppler-based velocity calculations may be utilized.

In some embodiments, rebounded reflections from the object may be used to determine velocity and/or acceleration data based on a detected shift in the ultrasound, as provided in block 1250. Ultrasound may be transmitted 1205 into a region bounded by at least one surface. A receiver may receive 1212 rebounded ultrasound reflections from at least one object or a site on an object within the region. A shift, such as a wavelength shift, frequency shift, or phase shift, may be determined 1213 between the transmitted ultrasound and the received ultrasound. The system may then generate 1216 velocity and/or acceleration data based on the detected shift. In various embodiments, velocity and/or acceleration data from direct reflections and rebounded reflections may be optionally combined 1218. Velocity and/or acceleration data from direct reflections and rebounded reflections may be used to determine two-dimensional vectors of velocity and/or acceleration information related to the object or a site on the object.

Figure 13A:
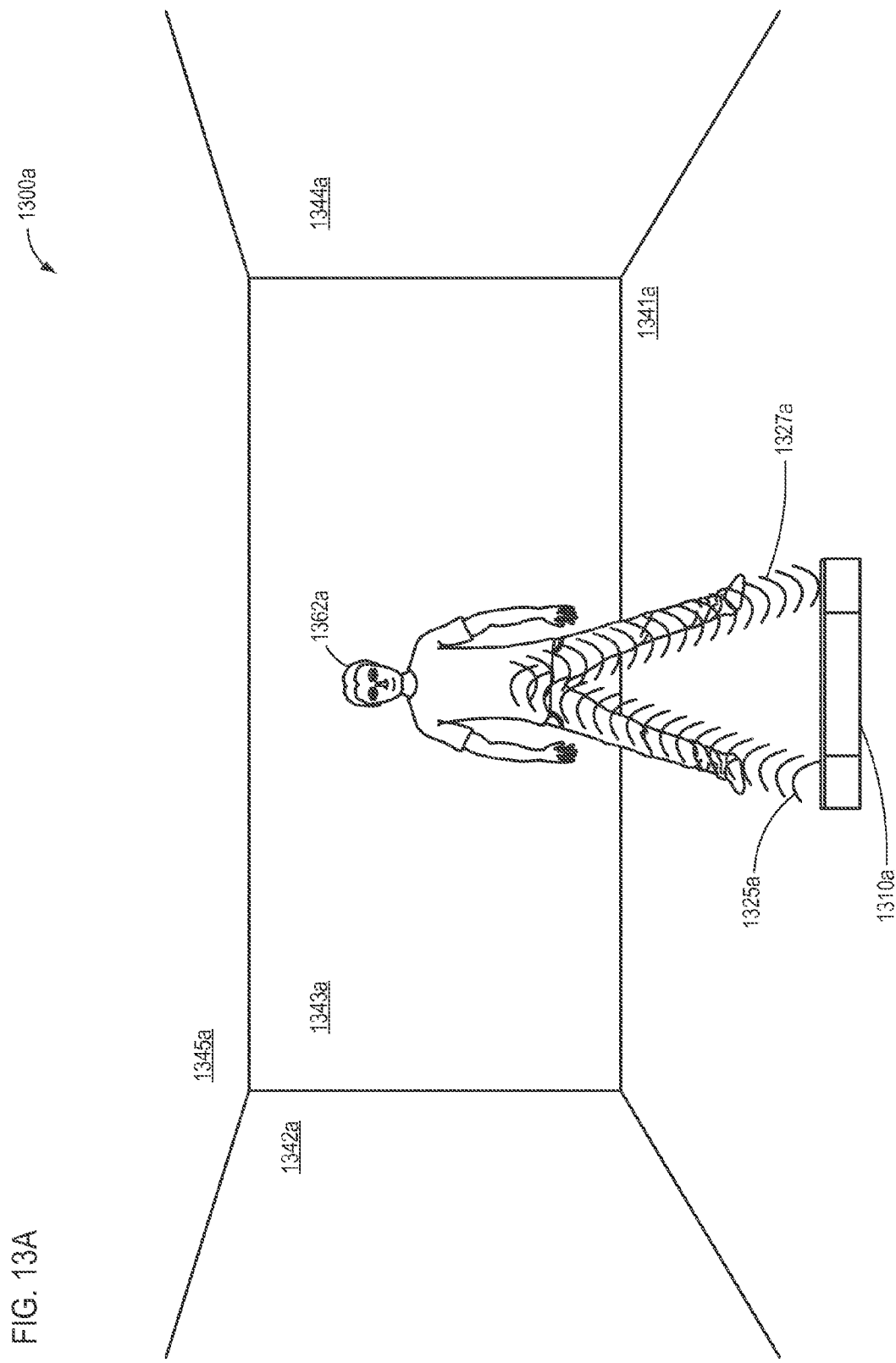
FIG. 13A illustrates a dual modality system transmitting and receiving ultrasound reflected off a person standing within a bounded region.

FIG. 13A illustrates a dual modality system 1310*a* transmitting ultrasound 1325*a* and receiving ultrasound 1327 reflected off a person 1362*a* standing within a bounded region 1300*a*. As illustrated, the bounded region 1300*a* is bounded by a floor 1341*a*, a left wall 1342*a*, a back wall 1343*a*, a right wall 1344*a*, and a ceiling 1345*a*. A front wall (not shown), may also bound the region 1300*a*.

The dual modality system 1310*a* may utilize its ultrasound modality similar to that discussed in relation to the previous figures. For example, the dual modality system 1310*a* may transmit the ultrasound 1325*a* as directional ultrasonic pulses, continuously, in a modulated fashion (frequency, amplitude, phase, etc.), and/or in another format. The ultrasound 1325*a* may be transmitted directly toward the person 1362*a* and/or the ultrasound 1325*a* may be transmitted indirectly toward the person 1362*a*.

FIG. 13B illustrates a dual modality system 1310*b* generating coarse image data of an object based on received ultrasonic reflections. As illustrated, the direct ultrasonic reflection 1327*b* may convey coarse image information in a relatively two-dimensional fashion. Dual modality system 1310*b* may use a processor to generate coarse image data of a person 1362*b* or other object. The actual image data received may be at a higher or lower resolution depending on the sampling rates, accuracy, processing bit depth, frequency(ies) of ultrasound used, etc. In certain examples, to use less processing power, the dual modality system 1310*b* may use a low resolution to track the object as a whole. If a low resolution is used, portions of interest may be identified for which more detailed information is desirable, useful, and/or necessary for a particular application.

Figure 13C:
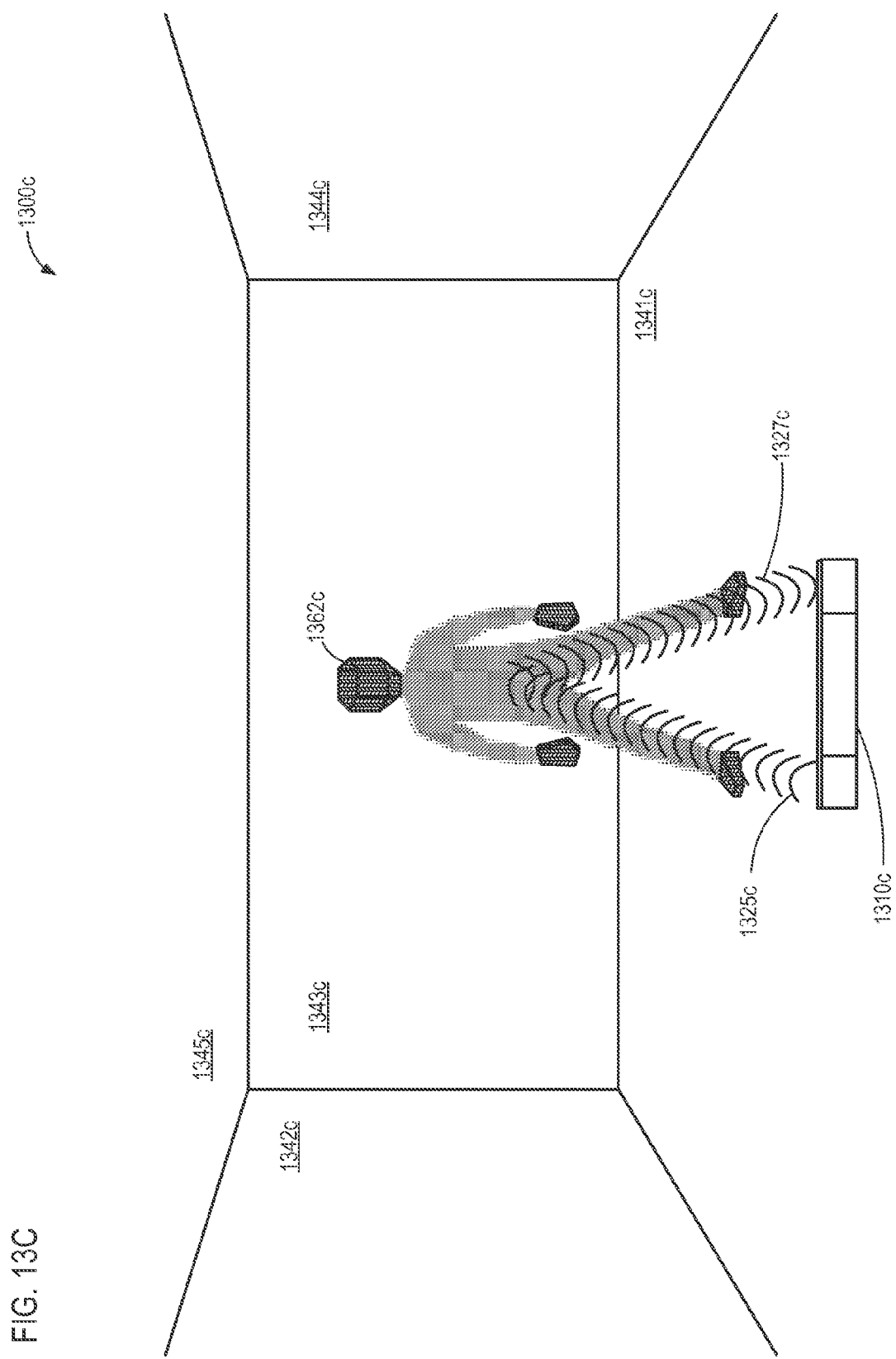
FIG. 13C illustrates a dual modality system identifying several portions of interest on an object based on coarse image data generated from ultrasonic reflections.

FIG. 13C illustrates a dual modality system 1310*c* identifying several portions of interest on an object using on coarse image data generated from ultrasonic reflections 1327*c* (or alternatively using received electromagnetic radiation). Portions of interest on a person 1362*c* may include a hand, finger, arm, leg, foot, toe, torso, neck, head, mouth, lip, and eye. For example, as illustrated in FIG. 13C dual modality system 1310*c* has identified the hands, feet, and head as portions of interest on person 1362*c*.

The portion of interest may be identified based partly on the state of an associated entertainment device. For example, a state of the associated entertainment device may utilize a hand movement for a particular action that cannot be determined using coarse image data. In that situation, the dual modality system 1310*c* may identify the hands of a person 1362*c* as a portion of interest for which fine image data (i.e., higher resolution images) are desired. Whatever portions of interest are identified, the dual modality system 1310*c* may use a second modality to receive additional and more detailed image information.

Figure 14:
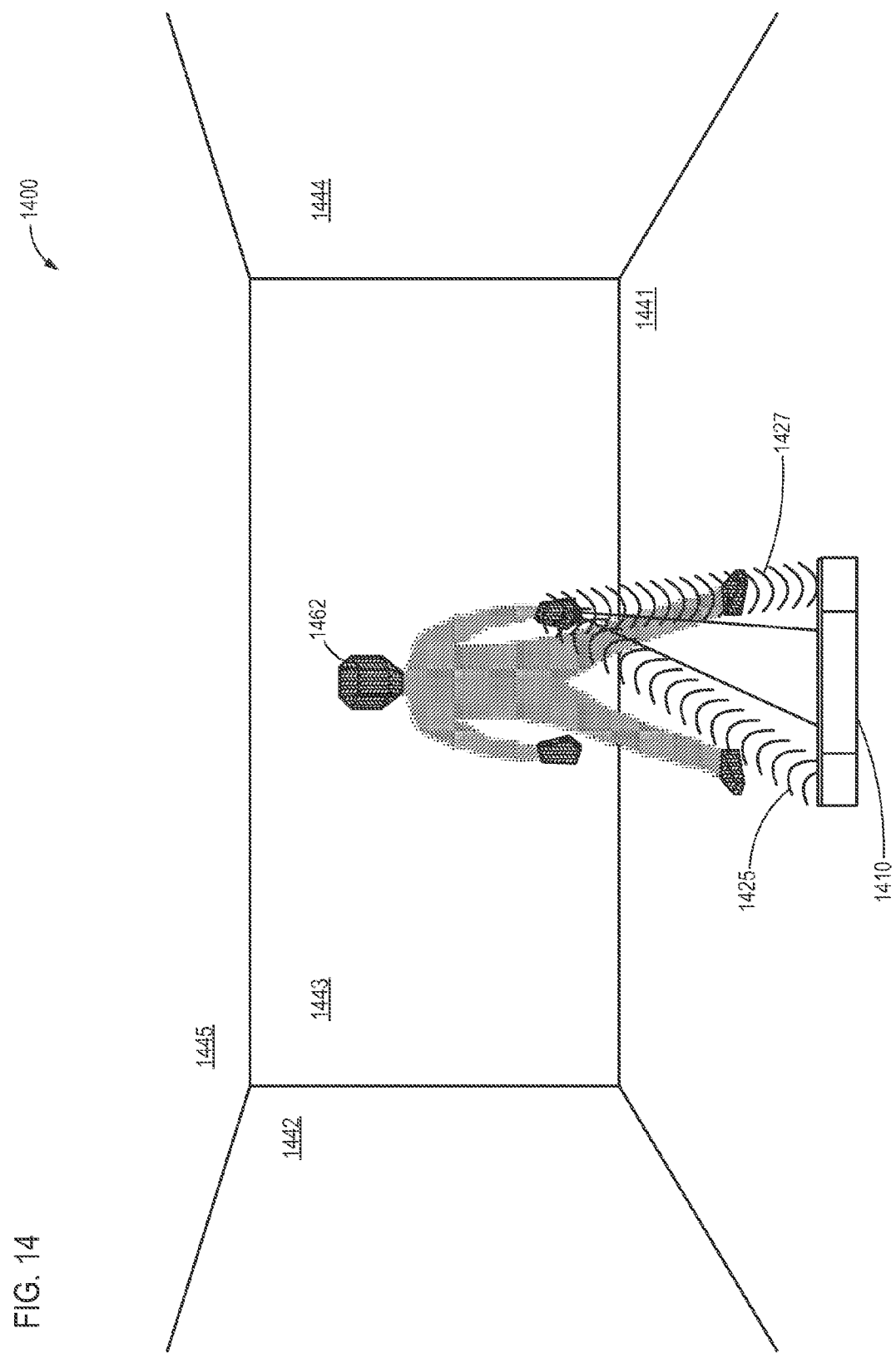
FIG. 14 illustrates a dual modality system using electromagnetic reflections in conjunction with ultrasound to receive additional image information from identified portion of interests.

For example, FIG. 14 illustrates a dual modality system 1410 using electromagnetic imaging in conjunction with ultrasound 1425 to receive additional image information from identified portion of interests. In addition to ultrasound, the dual modality system 1410 may use electromagnetic transmitters and/or receivers to receive/determine electromagnetic image information. For example, a laser or other electromagnetic radiation source may be used to receive image data of an object. In certain examples, the dual modality system 1410 may use a receiver such as an infrared receiver to gather image data from ambient radiation sources. In certain examples, electromagnetic radiation received may include microwave, terahertz, infrared, visible, and/or ultraviolet radiation.

A system may use electromagnetic imaging capabilities to either receive coarse image data at a low-resolution or fine image data at a higher, more detailed resolution. For example, FIG. 14 illustrates a dual modality system 1410 receiving electromagnetic radiation from an identified portion of interest on a two-dimensional coarse image generated using received ultrasound reflections 1427. The electromagnetic radiation received may be used to generate a higher resolution image than the image generated using the received ultrasound reflections 1427.

Figure 15:
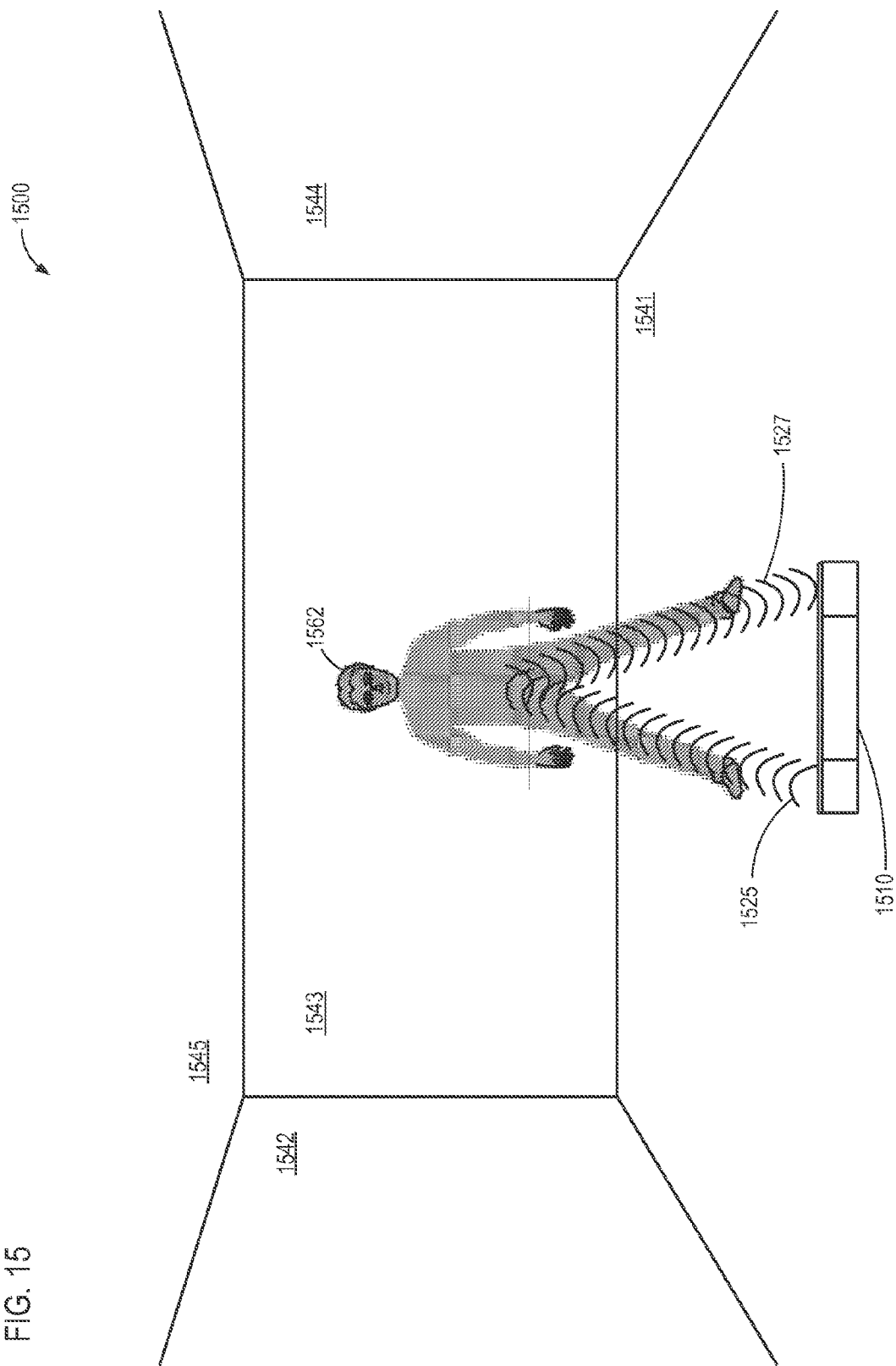
FIG. 15 illustrates a dual modality system generating fine image data of portions of interest on a person.

For example, FIG. 15 illustrates a dual modality system 1510 generating fine image data of portions of interest on a person 1562. One modality, such as ultrasound 1525, may be used to generate a coarse image with a low resolution while a second modality, such as electromagnetic radiation, may be used to generate a detailed image with a higher resolution. It will be understood that either ultrasound or electromagnetic radiation may be utilized to gather the low-resolution image or the higher resolution image.

Figure 16:
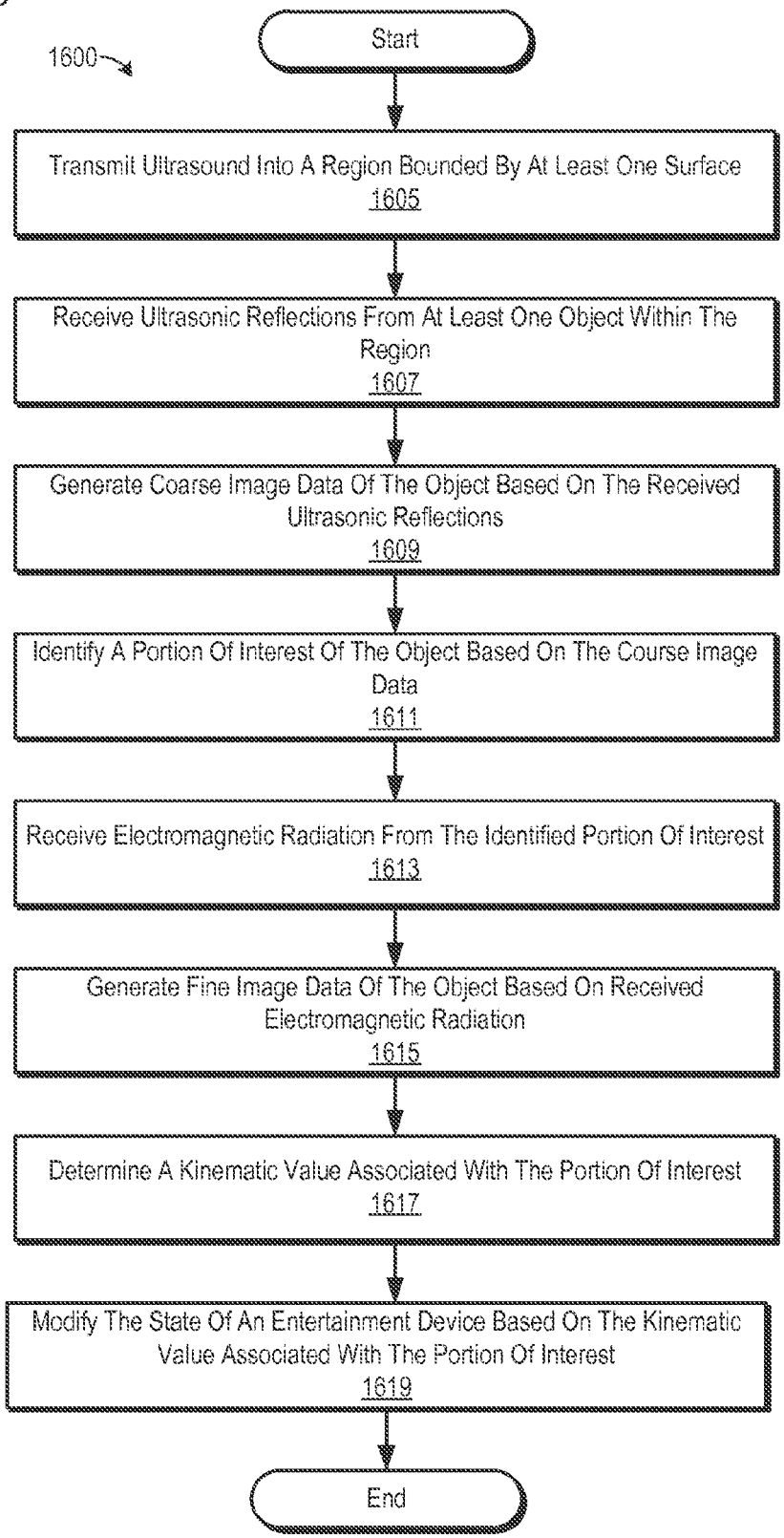
FIG. 16 illustrates a method for generating an image using ultrasound and electromagnetic radiation.

FIG. 16 illustrates a method for generating an image using ultrasound and electromagnetic radiation. The method steps are provided in no particular order and may be rearranged as would be technically feasible. A dual modality system may transmit 1605 ultrasound into a region bounded by at least one surface. The dual modality system may receive 1607 direct or rebounded ultrasonic reflections from at least one object within the region. Using the received ultrasonic reflection, the dual modality system may generate 1609 coarse image data of the object. The dual modality system may identify 1611 one or more portions of interest on an object. The dual modality system may receive 1613 electromagnetic radiation from the portion(s) of interest, and using the electromagnetic radiation, generate 1615 fine image data of the object. The fine image data may be of a higher resolution than the coarse image data. Optionally, the system may also determine 1617 a kinematic value associated with the portion of interest, and modify 1619 the state of an entertainment device based on the kinematic value.

Figure 17:
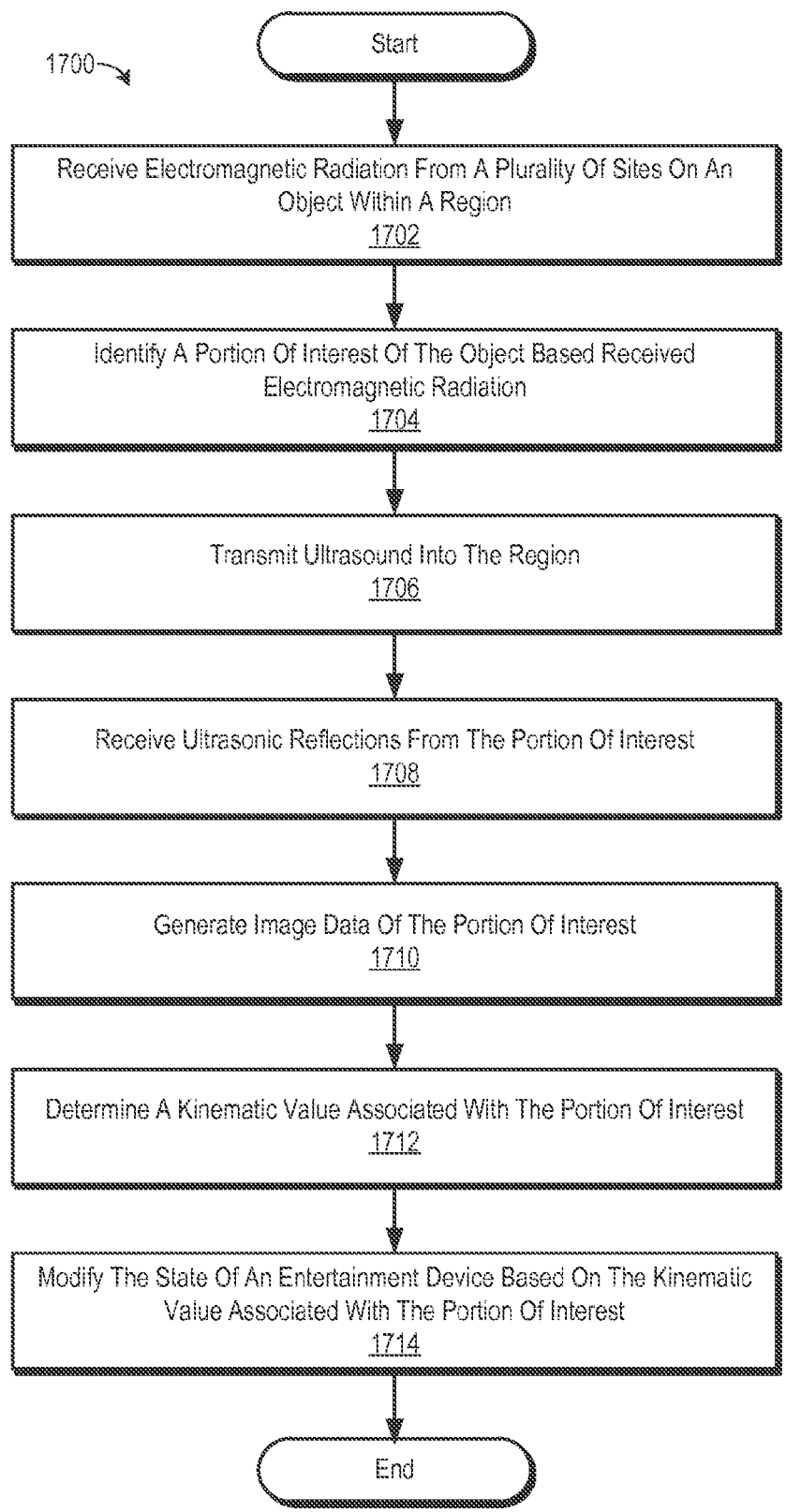
FIG. 17 illustrates another method for generating an image using ultrasound and electromagnetic radiation.

FIG. 17 illustrates a method for generating an image using ultrasound and electromagnetic radiation. The method steps are provided in no particular order and may be rearranged as would be technically feasible. The dual modality system may receive 1702 electromagnetic radiation from a plurality of sites within a region. In some embodiments, the received electromagnetic radiation may be used to generate a coarse image of an object or site on an object with the region. The dual modality system may identify 1704 one or more portions of interest on an object. The dual modality system may transmit 1706 ultrasound into the region, and receive 1708 direct or rebounded ultrasonic reflections from the portion of interest. From the received ultrasonic reflection, the dual modality system may generate 1710 fine (higher resolution) image data of the object and/or portions of interest on the object. Optionally, the system may also determine 1712 a kinematic value associated with the portion of interest, and modify 1714 the state of an entertainment device based on the kinematic value.

Figure 18:
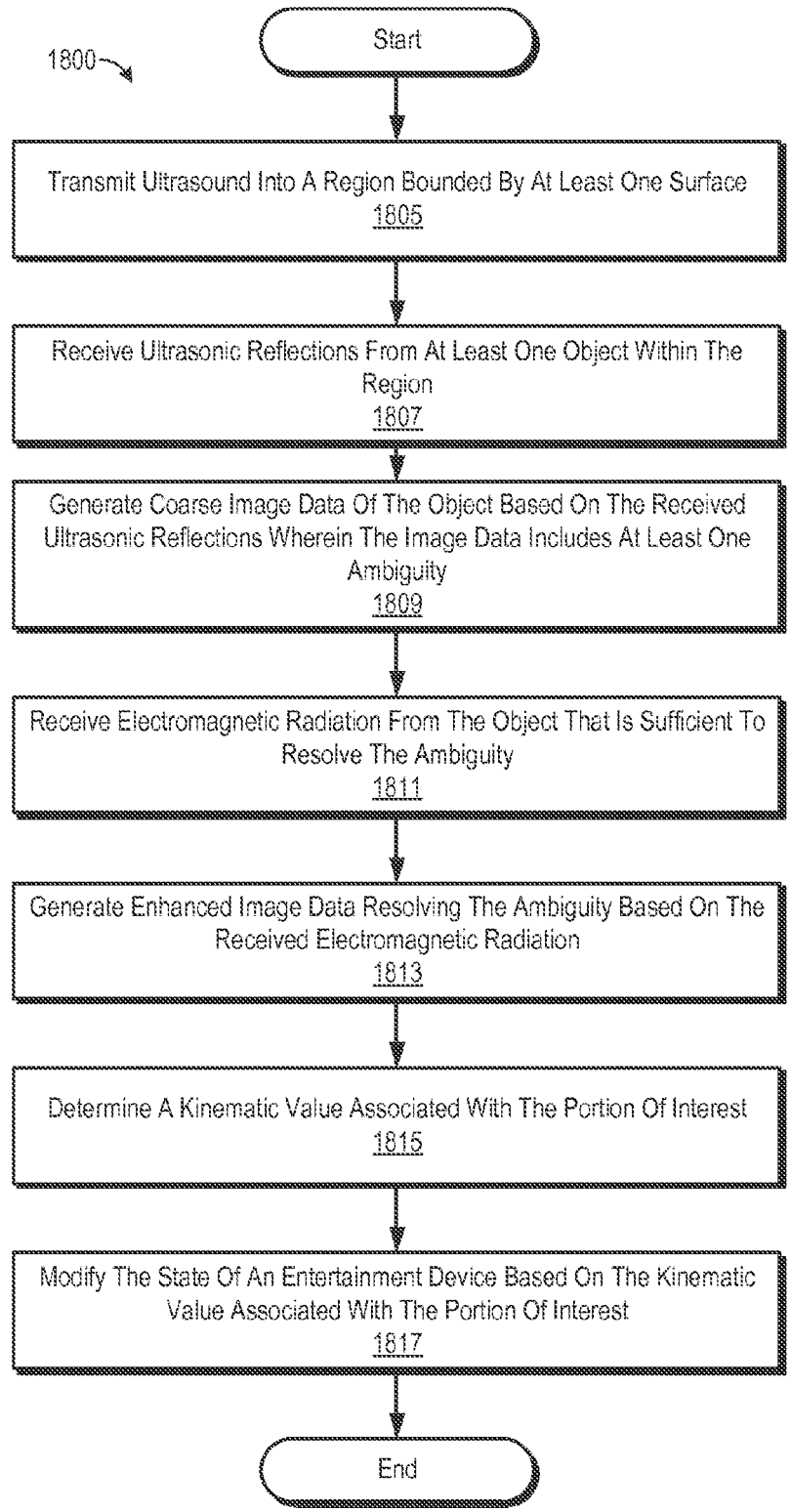
FIG. 18 illustrates a method for resolving ambiguities in an image using ultrasound and electromagnetic radiation.

FIG. 18 illustrates a method for resolving ambiguities in an image using ultrasound and electromagnetic radiation. The method steps are provided in no particular order and may be rearranged as would be technically feasible. A dual modality system may transmit 1805 ultrasound into a region bounded by at least one surface. The dual modality system may receive 1807 direct or rebounded ultrasonic reflections from at least one object within the region. Using the received ultrasonic reflection, the dual modality system may generate 1809 image data of the object. The image data generated using the received ultrasonic reflection may include at least one ambiguity, such as a ghost image. The dual modality system may receive 1811 electromagnetic radiation from the object that is sufficient to resolve the ambiguity. The dual modality system may generate 1813 enhanced image data that resolves the ambiguity based on the received electromagnetic radiation. Optionally, the system may also determine 1815 a kinematic value associated with the portion of interest and/or modify 1817 the state of an entertainment device based on the kinematic value.

This disclosure has been made with reference to various exemplary embodiments, including the best mode. However, those skilled in the art will recognize that changes and modifications may be made to the exemplary embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. The scope of the present invention should, therefore, be determined by the following claims:

What is claimed is:

1. A method for generating an image of an object within a region, comprising:
    transmitting ultrasound, via a first ultrasonic transmitter of an ultrasonic transmission system, into the region;
    receiving, via a first ultrasonic receiver of an ultrasonic receiver system, ultrasonic reflections of the transmitted ultrasound from a plurality of sites on the object within the region, the ultrasonic reflections comprising sound waves within a first frequency band, the ultrasonic reflections including direct ultrasonic reflection and rebounded ultrasonic reflection, wherein the direct ultrasonic reflection is reflected from a first portion of the object and the rebounded ultrasonic reflection is reflected from a second, different portion of the object;
    generating, via a processor, coarse image data of the object at a first resolution based on the received ultrasonic reflections;
    identifying a portion of interest on the object based on the coarse image data;
    receiving electromagnetic radiation from the identified portion of interest on the object, the electromagnetic radiation comprising electromagnetic waves within a second frequency band, the second frequency band being different than the first frequency band;
    generating fine image data of the portion of interest on the object at a second resolution based on the received electromagnetic radiation, wherein the second resolution is greater than the first resolution;
    determining a kinematic value associated with the portion of interest on the object based on at least one of the received electromagnetic radiation and the received ultrasonic reflections, wherein positional data is generated based at least on the direct ultrasonic reflection and the rebounded ultrasonic reflection, wherein the kinematic value is determined based at least in part on the positional data; and modifying the state of an entertainment device based on the determined kinematic value associated with the portion of interest on the object.

2. The method of claim 1, wherein the portion of interest is identified based at least in part on a state of the entertainment device.

3. The method of claim 1, further comprising transmitting electromagnetic energy into the region via an electromagnetic transmitter, and wherein receiving electromagnetic radiation from the identified portion of interest on the object comprises receiving a reflected portion of the transmitted electromagnetic radiation.

4. The method of claim 1, wherein at least one of the transmitted ultrasound and the received reflected ultrasound are rebounded from an auxiliary ultrasonic reflector.

5. The method of claim 1, wherein calculating the kinematic value associated with the portion of interest on the object comprises a Doppler velocity calculation in which the first velocity ($V_{dop}$) is a function of: a calculated shift ($\Delta_s$), the frequency of the transmitted ultrasound ($f_0$), an arrival velocity of the ultrasound ($V_{in}$), and a departure velocity of the ultrasound ($V_{out}$).

6. The method of claim 1, wherein detecting a shift and calculating the first velocity component are performed using a derivation or equivalent equation to the following equation:

$$f_r = \left(\frac{C - V_o}{C + V_o}\right) f_t,$$

where $f_r$ is based on the frequency of the received ultrasound, C is based on a velocity of the ultrasound in a medium within the region, $V_o$ is based on a velocity of the site on the object relative to the medium, and $f_t$ is based on a frequency of the transmitted ultrasound.

7. The method of claim 1, further comprising:
receiving, via a second ultrasonic receiver of the ultrasonic receiver system that is physically separated from the first ultrasonic receiver, an ultrasonic reflection from the object;
detecting a shift of the ultrasonic reflection received by the second ultrasonic receiver; and
calculating, via the processor, a second kinematic value associated with the portion of interest on the object based on the detected shift of the ultrasonic reflection received by the second ultrasonic receiver.

8. The method of claim 7, further comprising:
receiving, via a third ultrasonic receiver of the ultrasonic receiver system that is physically separated from the first ultrasonic receiver, an ultrasonic reflection from the object;
detecting a shift of the ultrasonic reflection received by the third ultrasonic receiver; and
calculating, via the processor, a third kinematic value associated with the portion of interest on the object based on the detected shift of the ultrasonic reflection received by the third ultrasonic receiver.

9. The method of claim 8, wherein the first, second and third ultrasonic receivers are non-collinear with respect to one another.

10. The method of claim 1, wherein a plurality of kinematic values are calculated for a corresponding plurality of sites on the object.

11. The method of claim 10, wherein the plurality of kinematic values are used to determine a translational velocity of the object.

12. The method of claim 1, wherein the portion of interest on the object comprises a portion of a person selected from the group consisting of a hand, finger, arm, leg, foot, toe, torso, neck, head, mouth, lip, and eye.

13. The method of claim 1, wherein determining the kinematic value of the portion of interest on the object comprises:
transmitting ultrasound, via the ultrasound transmission system, into the region, wherein the region is bounded by a first surface;
receiving, via the ultrasonic receiver system, the direct ultrasonic reflection from the object;
generating direct positional data associated with the object based on the direct ultrasonic reflection;
receiving the rebounded ultrasonic reflection from the object, wherein the rebounded ultrasonic reflection comprises ultrasound reflected by the object and the first surface prior to being received by the ultrasonic receiver;
generating rebounded positional data using the rebounded ultrasonic reflection of the object from the first surface; and
generating enhanced positional data by combining the direct positional data and the rebounded positional data.

14. The method of claim 1, wherein determining the kinematic value of the portion of interest on the object comprises:
transmitting ultrasound into the region, wherein the region is bounded by a first surface;
receiving the direct ultrasonic reflection from the object;
generating direct positional data associated with the object based on the direct ultrasonic reflection;
receiving a rebounded ultrasonic reflection from the object, wherein the rebounded ultrasonic reflection comprises ultrasound reflected by the object and the first surface prior to being received;
generating rebounded positional data using the rebounded ultrasonic reflection of the object from the first surface; and
generating enhanced positional data by combining the direct positional data and the rebounded positional data.

15. The method of claim 14, further comprising:
receiving an additional rebounded ultrasonic reflection from the object,
wherein the additional rebounded ultrasonic reflection comprises ultrasound reflected by the object and a second surface bounding the region prior to being received;
generating additional rebounded positional data using the additional rebounded ultrasonic reflection of the object from the second surface; and
supplementing the enhanced positional data with the additional rebounded positional data.

16. The method of claim 14, wherein transmitting the ultrasound comprises:
transmitting a first ultrasonic pulse that is received as the direct ultrasonic reflection; and
transmitting a second ultrasonic pulse that is received as the rebounded ultrasonic reflection.

17. A method for generating an image of an object within a region, comprising:
   receiving electromagnetic radiation from a plurality of sites on an object within a region, the electromagnetic radiation comprising electromagnetic waves within a first frequency band;
   identifying a portion of interest on the object based on the received electromagnetic radiation;
   transmitting ultrasound, via a first ultrasonic transmitter of an ultrasonic transmission system, into the region;
   receiving, via a first ultrasonic receiver of an ultrasonic receiver system, ultrasonic reflections of the transmitted ultrasound from the portion of interest on the object within the region, the ultrasonic reflections comprising sound waves within a second frequency band, the second frequency band being different than the first frequency band, the ultrasonic reflections including direct ultrasonic reflection and rebounded ultrasonic reflection, wherein the direct ultrasonic reflection is reflected from a first portion of the portion of interest on the object and the rebounded ultrasonic reflection is reflected from a second, different portion of the portion of interest on the object;
   generating, via a processor, image data of the portion of interest on the object at a first resolution based on the received ultrasonic reflections;
   determining a kinematic value associated with the portion of interest based on at least one of the received electromagnetic radiation and the received ultrasonic reflections, wherein positional data is generated based at least on the direct ultrasonic reflection and the rebounded ultrasonic reflection, wherein the kinematic value is determined based at least in part on the positional data; and
   modifying the state of an entertainment device based on the determined kinematic value associated with the portion of interest on the object.

18. The method of claim 17, further comprising generating image data of the object at a second resolution based on the received electromagnetic radiation, wherein the second resolution is less than the first resolution.

19. The method of claim 17, further comprising transmitting electromagnetic radiation into the region.

20. A method for generating an image of an object within a region, comprising:
   transmitting ultrasound, via an ultrasonic transmission system, into the region;
   receiving, via an ultrasonic receiver system, ultrasonic reflections of the transmitted ultrasound from a plurality of sites on the object within the region, the ultrasonic reflections comprising sound waves within a first frequency band, the ultrasonic reflections including direct ultrasonic reflection and rebounded ultrasonic reflection, wherein the direct ultrasonic reflection is reflected from a first portion of the object and the rebounded ultrasonic reflection is reflected from a second, different portion of the object;
   generating, via a processor, image data of the object at a first resolution based on the received ultrasonic reflections, wherein the image data at the first resolution includes at least one ambiguity;
   receiving electromagnetic radiation reflected by the object that is sufficient to resolve the at least one ambiguity, the electromagnetic radiation comprising electromagnetic waves within a second frequency band, the second frequency band being different than the first frequency band;
   generating enhanced image data resolving the at least one ambiguity based on the received electromagnetic radiation;
   determining a kinematic value associated with the object based on at least one of the received electromagnetic radiation and the received ultrasonic reflections, wherein positional data is generated based at least on the direct ultrasonic reflection and the rebounded ultrasonic reflection, wherein the kinematic value is determined based at least in part on the positional data; and
   modifying the state of an entertainment device based on the determined kinematic value associated with the portion of interest on the object.

21. The method of claim 20, wherein resolving the at least one ambiguity comprises determining which of a plurality of images associated with the image data is a ghost image.

22. The method of claim 20, further comprising directing electromagnetic radiation towards a site on the object associated with the at least one ambiguity.

23. A system for generating an image of an object within a region, comprising:
   an ultrasonic transmitter configured to transmit ultrasound into the region;
   an ultrasonic receiver configured to receive an ultrasonic reflection of the transmitted ultrasound from a plurality of sites on the object within the region, the ultrasonic reflections comprising sound waves within a first frequency band, the ultrasonic reflection including a direct ultrasonic reflection and a rebounded ultrasonic reflection, wherein the direct ultrasonic reflection is reflected from a first portion of the object and the rebounded ultrasonic reflection is reflected from a second, different portion of the object;
   a first imaging module configured to generate coarse image data of the object at a first resolution based on the received ultrasonic reflections;
   an identification module configured to identify a portion of interest on the object based on the coarse image data;
   an electromagnetic radiation receiver configured to receive electromagnetic radiation from the identified portion of interest on the object, the electromagnetic radiation comprising electromagnetic waves within a second frequency band, the second frequency band being different than the first frequency band;
   a second imaging module configured to generate fine image data of the portion of interest on the object at a second resolution based on electromagnetic radiation received by the electromagnetic radiation receiver, wherein the second resolution is greater than the first resolution;
   a kinematic determination module configured to determine a kinematic value associated with the portion of interest on the object based on at least one of received electromagnetic radiation and received ultrasonic reflections, wherein positional data is generated based at least on the direct ultrasonic reflection and the rebounded ultrasonic reflection, wherein the kinematic value is determined based at least in part on the positional data; and
   a modification module configured to modify the state of an entertainment device based on the kinematic value associated with the portion of interest on the object.

24. The system of claim 23, wherein the kinematic value of the object comprises a velocity of the object.

25. The system of claim 23, wherein at least one of the transmitted ultrasound and the reflected ultrasound are rebounded from an auxiliary ultrasonic reflector.

26. The system of claim 23, further comprising:
a second ultrasonic receiver that is physically separated from the first ultrasonic receiver, wherein the second ultrasonic receiver is configured to receive an ultrasonic reflection from the site;
wherein a shift module is configured to detect a shift of the ultrasonic reflection received by the second ultrasonic receiver, and
wherein the kinematic value module is configured to calculate a second kinematic value associated with the portion of interest on the object based on the detected shift of the ultrasonic reflection received by the second ultrasonic receiver.

27. The system of claim 26, further comprising:
a third ultrasonic receiver that is physically separated from the first and second ultrasonic receivers, wherein the third ultrasonic receiver is configured to receive an ultrasonic reflection from the site,
wherein the shift module is configured to detect a shift of the ultrasonic reflection received by the third ultrasonic receiver, and
wherein the kinematic value module is configured to calculate a third kinematic value associated with the portion of interest on the object based on the detected shift of the ultrasonic reflection received by the third ultrasonic receiver.

28. The system of claim 27, further comprising:
a prediction module configured to predict a relative position of the object at a future time based on (1) the first kinematic value associated with the portion of interest on the object, (2) the second kinematic value associated with the portion of interest on the object, and (3) the third kinematic value associated with the portion of interest on the object.

29. A system for generating an image of an object within a region, comprising:
an electromagnetic radiation receiver configured to receive electromagnetic radiation from a plurality of sites on an object within a region, the electromagnetic radiation comprising electromagnetic waves within a first frequency band;
an identification module configured to identify a portion of interest on the object based on the received electromagnetic radiation;
an ultrasonic transmitter configured to transmit ultrasound into the region;
an ultrasonic receiver configured to receive an ultrasonic reflection of the transmitted ultrasound from the portion of interest on the object within the region, the ultrasonic reflections comprising sound waves within a second frequency band, the second frequency band being different than the first frequency band, the ultrasonic reflection including a direct ultrasonic reflection and a rebounded ultrasonic reflection, wherein the direct ultrasonic reflection is reflected from a first portion of the object and the rebounded ultrasonic reflection is reflected from a second, different portion of the object;
a first imaging module configured to generate image data of the portion of interest on the object at a first resolution based on the received ultrasonic reflections;
a kinematic determination module configured to determine a kinematic value associated with the portion of interest on the object based on at least one of received electromagnetic radiation and received ultrasonic reflections, wherein positional data is generated based at least on the direct ultrasonic reflection and the rebounded ultrasonic reflection, wherein the kinematic value is determined based at least in part on the positional data; and
a modification module configured to modify the state of an entertainment device based on the kinematic value associated with the portion of interest on the object.

30. The system of claim 29, wherein the kinematic value of the object comprises a position of the object.

31. The method of claim 1, wherein the first frequency band is between 20 kilohertz (kHz) and 250 kHz.

32. The method of claim 1, wherein the first frequency band is between 35 kHz and 45 kHz.

33. The method of claim 17, wherein the second frequency band is between 20 kilohertz (kHz) and 250 kHz.

34. The method of claim 18, wherein the second frequency band is between 35 kHz and 45 kHz.

35. The method of claim 20, wherein the first frequency band is between 20 kilohertz (kHz) and 250 kHz.

36. The method of claim 20, wherein the first frequency band is between 35 kHz and 45 kHz.

37. The system of claim 23, wherein the first frequency band is between 20 kilohertz (kHz) and 250 kHz.

38. The system of claim 23, wherein the first frequency band is between 35 kHz and 45 kHz.

39. The system of claim 29, wherein the second frequency band is between 20 kilohertz (kHz) and 250 kHz.

40. The system of claim 29, wherein the second frequency band is between 35 kHz and 45 kHz.

* * * * *

UNITED STATES PATENT AND TRADEMARK OFFICE
CERTIFICATE OF CORRECTION

| | | |
|---|---|---|
| PATENT NO. | : 9,437,002 B2 | Page 1 of 1 |
| APPLICATION NO. | : 14/496037 | |
| DATED | : September 6, 2016 | |
| INVENTOR(S) | : Jesse R. Cheatham, III et al. | |

It is certified that error appears in the above-identified patent and that said Letters Patent is hereby corrected as shown below:

In the Claims

Column 26, line 33, claim 34 "The method of claim 18, wherein" should read
--The method of claim 17, wherein--

Signed and Sealed this
Twentieth Day of December, 2016

Michelle K. Lee
*Director of the United States Patent and Trademark Office*